United States Patent
Filter et al.

(10) Patent No.: US 12,530,693 B2
(45) Date of Patent: Jan. 20, 2026

(54) REOCCURRING DIGITAL ASSET-BASED INTERACTION

(71) Applicant: Flexa Inc., New York, NY (US)

(72) Inventors: Trevor Filter, New York, NY (US); Zachary Kilgore, Brooklyn, NY (US); Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 223 days.

(21) Appl. No.: 17/732,753

(22) Filed: Apr. 29, 2022

(65) Prior Publication Data

US 2023/0101940 A1     Mar. 30, 2023

Related U.S. Application Data

(63) Continuation of application No. 17/449,420, filed on Sep. 29, 2021.

(51) Int. Cl.
*G06Q 20/40* (2012.01)
*G06Q 20/06* (2012.01)
*G06Q 30/0601* (2023.01)

(52) U.S. Cl.
CPC ..... *G06Q 20/4097* (2013.01); *G06Q 20/0652* (2013.01); *G06Q 20/401* (2013.01); *G06Q 30/0611* (2013.01)

(58) Field of Classification Search
CPC ........... G06Q 20/4097; G06Q 20/0652; G06Q 20/401; G06Q 30/0611
USPC .......................................................... 705/64
See application file for complete search history.

(56) References Cited

U.S. PATENT DOCUMENTS

| 10,540,639 B2 | 1/2020 | Brock | |
|---|---|---|---|
| 2016/0180302 A1* | 6/2016 | Bagot, Jr. | G06Q 20/102 705/40 |
| 2016/0371771 A1* | 12/2016 | Serrano | H04L 67/12 |
| 2018/0330342 A1* | 11/2018 | Prakash | H04L 9/50 |
| 2019/0164221 A1* | 5/2019 | Hill | G06Q 20/405 |
| 2020/0013045 A1* | 1/2020 | Spalding | G06Q 20/065 |
| 2020/0258061 A1* | 8/2020 | Beadles | H04L 63/102 |
| 2021/0049685 A1* | 2/2021 | Tachau | G06Q 40/03 |
| 2021/0090166 A1* | 3/2021 | Bayne | G06Q 20/3825 |
| 2021/0133869 A1* | 5/2021 | Brock | G06Q 20/4016 |

(Continued)

*Primary Examiner* — Courtney P Jones
(74) *Attorney, Agent, or Firm* — Garlick & Markison; Patricia M. Healy

(57) ABSTRACT

A method includes initiating a reoccurring digital asset-based interaction between a first and second computing entity of a digital asset-based interaction system, providing, by the first computing entity, first computing entity information to the second computing entity, and storing, by the second computing entity, the first computing entity information. When the reoccurring digital asset-based interaction occurs, the method further includes sending, by the second computing entity, at least a portion of the first computing entity information and second computing entity information to a digital asset-based interaction computing entity, obtaining, by the digital asset-based interaction computing entity, the amount of the digital asset from the first computing entity, locking an amount of system digital asset to back the reoccurring digital asset-based interaction, and sending a confirmation to the second computing entity that the reoccurring digital asset-based interaction is successful.

18 Claims, 19 Drawing Sheets

(56) References Cited

U.S. PATENT DOCUMENTS

| | | | |
|---|---|---|---|
| 2021/0295285 A1* | 9/2021 | Rajendran | G06Q 20/0855 |
| 2021/0295290 A1* | 9/2021 | Buradagunta | G06Q 20/38215 |
| 2022/0058732 A1* | 2/2022 | Reses | G06Q 20/065 |
| 2022/0230154 A1* | 7/2022 | Shah | G06Q 10/10 |
| 2022/0237598 A1* | 7/2022 | Cabrera | G06Q 20/26 |
| 2023/0306509 A1* | 9/2023 | Cotton | G06Q 40/06 |

* cited by examiner digital asset-based interaction system 10 borderless digital asset-based interaction system 98

REOCCURRING DIGITAL ASSET-BASED INTERACTION

CROSS-REFERENCE TO RELATED APPLICATIONS

The present U.S. Utility Patent Application claims priority pursuant to 35 U.S.C. § 120 as a continuation of U.S. Utility application Ser. No. 17/449,420, entitled "PRE-AUTHORIZATION HOLD DIGITAL ASSET-BASED INTERACTION" filed Sep. 29, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to digital asset-based interactions and more specifically to interaction modes of a digital asset-based interaction system.

Description of Related Art

Current payment systems are vulnerable to security breaches, fraud, and identity theft. A typical payment card transaction with a merchant involves several steps (e.g., payment card authorization, clearing, and settlement) and the participation of various entities (e.g., financial institutions, payment card companies, and payment processing networks). Each step and each entity have their own varying security limitations.

The steps involved are also inconvenient, time consuming, and expensive. For example, payment card authorization (e.g., credit or debit card authorization) begins with the cardholder presenting the payment card to a merchant for goods or service. The payment card is issued by a particular financial institution (e.g., a bank) and is associated with a payment card network (e.g., Visa, Mastercard, etc.). The merchant uses a payment card machine, software, or gateway to transmit transaction data to their acquiring bank (or its processor). The acquiring bank routes the transaction data to a payment processing network and the payment processing network sends the transaction data to the cardholder's issuing bank. The issuing bank validates that the card has not been reported stolen or lost, confirms whether funds/credit is available, and sends a response code back through the payment processing network to the acquiring bank as to whether the transaction is approved.

The transaction data typically includes the payment card number, transaction amount, date, merchant's name, merchant's location, merchant category code, and an encrypted personal identification number (PIN) if entered. A response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The payment processing network debits the issuing bank account and credits the acquiring bank account for the amount of the transaction.

Merchants pay substantial payment card processing fees and those costs are passed along to consumers in the form of higher prices. Most merchants pay an interchange rate on a total transaction and a flat fee to the payment card company involved (e.g., Visa, Mastercard, etc.). Rates vary based on the payment card company, the payment card type (e.g., credit, debit, business, etc.), processing type (e.g., online payment, swiped, through a mobile device, card not present, etc.), and a Merchant Category Code (MCC) that classifies a merchant's type of business. Further, merchants typically pay a commission and a flat fee to the payment processing network.

Mobile wallet applications allow cardholders to store payment card data on a computing device via a digital wallet for more convenient transactions. For example, some mobile wallet apps use near field communication (NFC) for contactless payments (e.g., exchange of data by holding a device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment.

Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

Distributed ledger technology (DLT) is a digital system that provides a consensus of replicated, shared, and synchronized digital data spread across several nodes. Unlike traditional databases, DLTs often lack central authority. The nodes of a DLT implement a consensus protocol to validate the authenticity of transactions recorded in the ledger.

Distributed ledger technology reduces the risk of fraudulent activity. For example, a blockchain is a type of DLT consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the network. Once recorded on the blockchain, transactions cannot be altered.

A cryptocurrency is a digital asset that is created and transferred via cryptography. Many cryptocurrencies are distributed networks based on distributed ledger technology (e.g., a blockchain). Decentralized networks like Bitcoin use pseudo-anonymous transactions that are open and public (i.e., anyone can join, create, and view transactions). To eliminate fraudulent transactions and deter malicious network activity, cryptocurrency transactions can be recorded by "miners" using "proof of work" secure hashing algorithms (SHA-256) that require significant computing power. While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

BRIEF DESCRIPTION OF THE SEVERAL
VIEWS OF THE DRAWING(S)

DETAILED DESCRIPTION OF THE
INVENTION

Figure 1:
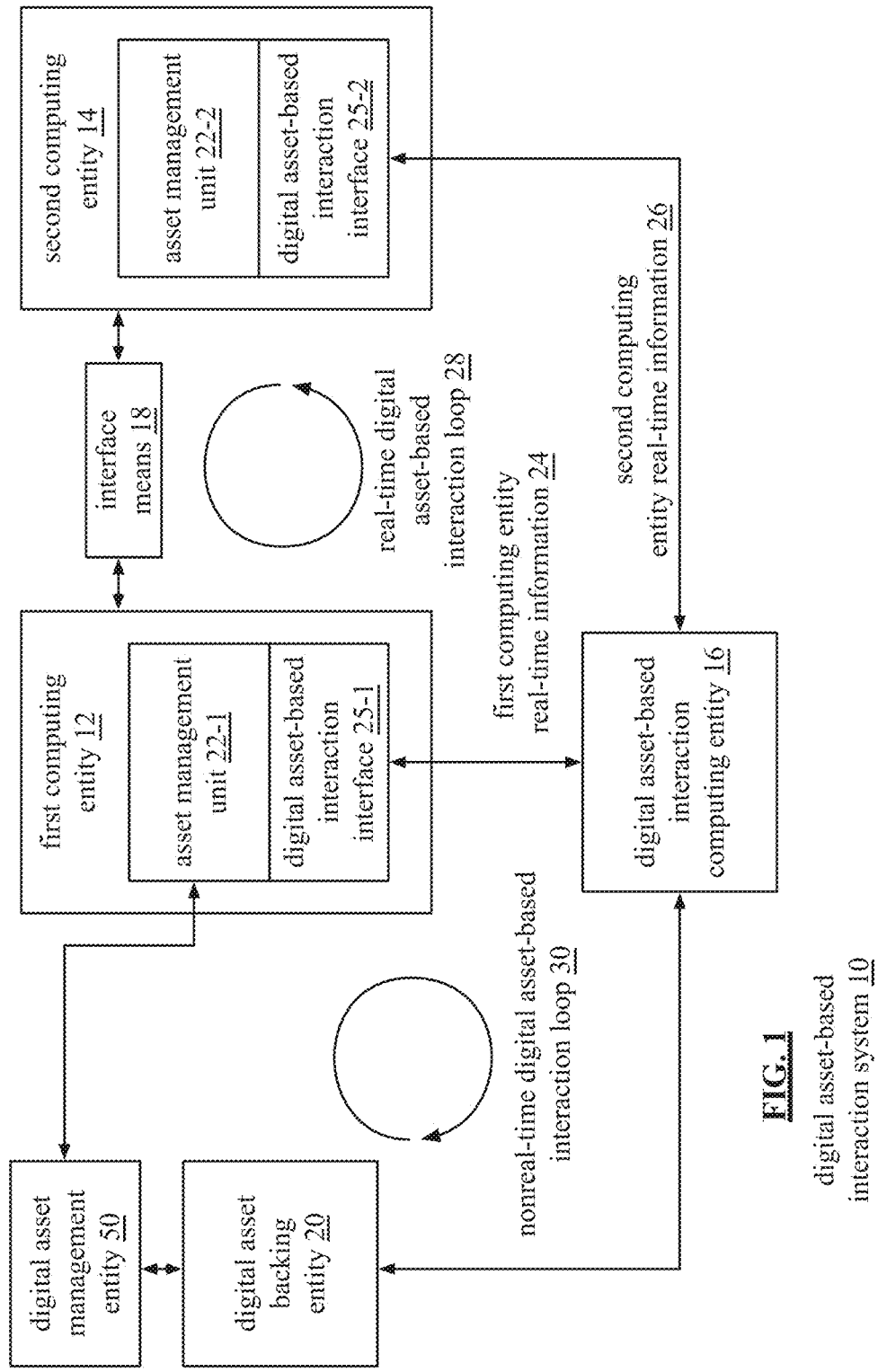
FIG. 1 is a schematic block diagram of an embodiment of a digital asset-based interaction system.

FIG. 1 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, and a digital asset management computing entity 50. The digital asset-based interaction system 10 facilitates a digital asset-based interaction (e.g., a digital asset-based payment) between the first computing entity 12 and the second computing entity 14 where the first computing entity 12 provides a digital asset (e.g., cryptocurrency) and the second computing entity 14 (e.g., a merchant) accepts assets in a desired asset format (e.g., fiat currency, a specific digital asset) and overcomes the following issues.

At the filing of this application, digital assets such as cryptocurrency are not widely accepted by merchants as a form of payment for a variety of reasons. For one, many merchants do not want to hold cryptocurrency. Holding cryptocurrency involves several issues merchants are unfamiliar with and/or unequipped to deal with. These issues include holding private key information, legal compliance, government regulation, timing issues such as waiting for transaction confirmations, etc. Accepting digital assets such as cryptocurrency presents operational security issues and includes a level of technical complexity outside the scope of general merchant capabilities. Additionally, the value of cryptocurrency can be volatile, sometimes fluctuating dramatically in the course of one day. As another reason, merchants are reluctant to invest in expensive point-of-sale upgrades to accommodate cryptocurrency payments directly. As yet another reason, many cryptocurrency payments are public and potentially expose sensitive merchant/customer information.

While some digital wallet applications enable retail blockchain payments, they are universally dependent on existing payment networks and thus are susceptible to the fraud attacks of the existing payment networks. For example, a cryptocurrency is linked to a payment card (e.g., a credit card, debit card, gift card, etc.), where a cryptocurrency payment is converted and conducted as a payment card transaction and, thus susceptible to the same fraud attacks as the payment card. Further, a billing address and/or other personal customer information may be required for a merchant to verify traditional payment card payments. A merchant may store this information which consumes data storage space and renders additional private customer information vulnerable to theft and fraud. Additionally, the costs of the existing payment network (e.g., payment transaction costs, fees, etc.) are maintained. Adding a digital asset payment option within an existing payment network only increases those costs.

Even though digital asset payments such as cryptocurrency payments eliminate fraudulent activity as compared to traditional payment systems, malicious exploits using digital asset transactions are possible. For example, malicious users can manipulate a cryptocurrency blockchain to "double spend" (e.g., create one transaction within a block to transfer an amount to a merchant and create another block without that transaction such that the transfer to the merchant does not exist). As another example, malicious or faulty digital wallet software can prevent a digital asset transaction from being authorized and completed correctly.

Within the digital asset-based interaction system 10, the first computing entity 12, the second computing entity 14, the digital asset-based interaction computing entity 16, the digital asset backing computing entity 20, and the digital asset management computing entity 50 may be one or more computing devices, one or more distributed computing devices, and/or one or more modules executing on one or more computing devices.

The first computing entity 12, the second computing entity 14, the digital asset-based interaction computing entity 16, the digital asset backing computing entity 20, and the digital asset management computing entity 50 may be one or more portable computing devices and/or one or more fixed computing devices. A portable computing device may be a social networking device, a gaming device, a cell phone, a smart phone, a digital assistant, a digital music player, a digital video player, a laptop computer, a handheld computer, a tablet, a video game controller, a virtual reality (VR) computing device, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., attended cash register, unattended register, etc.), and/or any type of home or office computing equipment.

The digital asset-based interaction computing entity 16 is operable to convert (i.e., exchange) a digital asset (e.g., a cryptocurrency) to an asset in a desired asset format (e.g., fiat currency, another digital asset such as a different cryptocurrency, etc.), back digital-asset based interactions via the digital asset back entity 20 such that digital asset-based interactions can be authorized and/or completed successfully in real-time, and verify digital assets (e.g., connect to a consensus network that implements a verification method associated with the digital asset). Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

The digital asset-based interaction computing entity 16 may be associated with an entity specially licensed for exchange when licensing is required. In an embodiment, the digital asset-based interaction computing entity 16 may be associated with one or more digital asset holding companies. A digital asset holding company stores sensitive materials and has insurance policies to protect against theft and fraud. A digital asset holding company may be specially licensed for holding digital assets when licensing is required.

The digital asset-based interaction computing entity 16 may be associated with a stored value account (SVA) device where the SVA device is associated with the second computing entity 14 (e.g., a second computing entity has an SVA account with the SVA device) such that an SVA is generated for payment. In another embodiment, the digital asset-based interaction computing entity 16 is operable to generate stored value accounts (SVAs). Generation of SVAs for transactions is described in co-pending patent application Ser. No. 16/376,911, entitled, "SECURE AND TRUSTED DATA COMMUNICATION SYSTEM," filed Apr. 5, 2019.

Each of the first and second computing entities 12 and 14 include an asset management unit 22-1 and 22-2 respectively. The asset management units 22-1 and/or 22-2 may be digital wallet applications or network enabled smart contract applications installed on or otherwise usable by the first and second computing entities 12 and 14 that function to store and manage (e.g., buy, sell, trade, custody, etc.) digital assets. Alternatively, an asset management unit may be an application that facilitates receiving assets during an interaction such as POS software and/or hardware that may or may not include a digital wallet function depending on the types of assets a computing entity wishes to accept and the desired method of receiving those assets.

The asset management units 22-1 and/or 22-2 may be custodial digital wallet applications associated with a digital asset management computing entity 50 that may be specially licensed and insured to hold digital assets (e.g., a digital asset holding and management company, a cryptocurrency holding company, a cryptocurrency holding and exchange company, etc.). Alternatively, the asset management units 22-1 and/or 22-2 may be non-custodial digital wallet applications associated with a non-custodial digital asset management computing entity 50 (e.g., a digital asset exchange company) where the asset management units 22-1 and/or 22-2 store digital assets and the first and second computing entities 12-14 manage private keys to the asset management units 22-1 and/or 22-2.

Alternatively, the asset management units 22-1 and/or 22-2 may be custodial or non-custodial digital wallet applications associated with the digital asset-based interaction computing entity 16 (e.g., where the digital asset-based interaction computing entity 16 is a digital asset management computing entity 50). Alternatively, the asset management units 22-1 and/or 22-2 are network enabled smart contract applications. A network enabled smart contract application allows a user to upload digital assets to a network enabled smart contract using a private key (e.g., non-custodial) and eliminates double spending issues associated with non-custodial wallets.

The digital asset backing computing entity 20 may be a part of or separated from the digital asset-based interaction computing entity 16. The digital asset backing computing entity 20 stores (or otherwise has access to) system digital assets (e.g., system cryptocurrency, system tokens, etc.) as collateral to back digital asset-based interactions of the digital asset-based interaction system 10. The system digital assets may be any digital asset that the digital asset-based interaction system chooses to use. For example, the system digital asset is a token on the Ethereum blockchain specifically created for use in the digital asset-based interaction system. As another example, the system digital asset is an already established and trusted cryptocurrency.

The digital asset backing computing entity 20 is associated with the first computing entity 12, the second computing entity 14, and/or a type of digital asset. As an example, the digital asset backing computing entity 20 is associated with the asset management unit 22-1 of the first computing entity 12.

The digital asset management computing entity 50 is associated with the digital asset backing computing entity 20 via one or more accounts and is operable to deposit system digital assets into the one or more accounts to back digital asset-based interactions of users of an associated asset management unit (e.g., asset management unit 22-1). The digital asset management computing entity 50 is incentivized to back asset management unit interactions by receiving rewards from the digital asset backing computing entity 20 such as a percentage of system digital asset back on successful transactions. Additionally, the system digital asset provides payment utility such as lower foreign exchange rates.

Further, because the digital asset management computing entity 50 is backing the asset management unit interactions, the digital asset management computing entity 50 is incentivized to produce a quality asset management unit that prevents user fraud and to remedy faulty software that affects transaction success. When a computing entity functions to primarily receive assets (e.g., the computing entity is a merchant computing device), an asset management unit (e.g., asset management unit 22-2) is not necessarily associated with a digital asset management computing entity 50 if there is no need to send back digital assets (e.g., assets are received and not sent). For example, when the second computing entity 14 is a merchant computing entity, the asset management unit 22-2 may be merchant POS software enabled for use in the digital asset-based interaction system 10.

The digital asset management computing entity 50 is also referred to as a staking entity and in this example, is associated with a developer of the asset management units 22-1 and 22-2 (e.g., a digital wallet developer). In another embodiment, the asset management units 22-1 and 22-2 may be backed by a different and/or additional type(s) of staking entities such as one or more user computing devices, one or more merchant computing entities, one or more computing entities associated with a corporation and/or business, etc.

The asset management units 22-1 and 22-2 include digital asset-based interaction interfaces 25-1 and 25-2 operable to interface with the digital asset-based interaction computing entity 16. The digital asset-based interaction interfaces 25-1 and 25-2 are digital asset-based interaction computing entity application programming interfaces (APIs) integrated into asset management units 22-1 and 22-2 that allow the first and second computing entities 12 and 14 to connect to the digital asset-based interaction computing entity 16 for digital asset-based interactions. The digital asset-based interaction interfaces 25-1 and 25-2 facilitate digital asset-based interaction system 10 interactions and will be discussed in greater detail with reference to FIG. 4.

A digital asset-based interaction interface may be included in an asset management unit when the digital asset management computing entity 50 deposits system digital assets to back interactions made by the asset management unit or in an asset management unit that primarily receives assets (e.g., a merchant) via the digital asset-based interaction system 10. The first and second computing entities 12 and 14 are operable to establish an account with the digital asset-based interaction computing entity 16 to use the digital asset-based interaction interfaces 25-1 and 25-2. The first and second computing entities 12 and 14 are operable to access features of the digital asset-based interaction computing entity 16 via the digital asset-based interaction interfaces 25-1 and 25-2 (e.g., via a direct link or by signing in for temporary use).

The second computing entity 14 may be associated with a particular merchant that facilitates payments from the first computing device 12 to the merchant. For example, the second computing entity may be a fixed POS computing device, a merchant e-commerce website, a merchant mobile application ("app"), etc. The second computing entity 14 may include payment features tailored to the type of second computing entity 14 involved in a payment. For example, when the second computing entity 14 is a fixed POS computing device (e.g., a register), the second computing entity includes features for in-person payment interaction (e.g., a scanning device, a touchscreen, a receipt printer, etc.).

As another example, when the second computing entity 14 is an e-commerce website or merchant mobile application ("app") the second computing entity may include a variety of existing payment processing features (e.g., existing hardware and/or software) for processing online payments within existing payment networks (e.g., a Secure Socket Layers (SSL) certificate, e-commerce shopping cart software, order and product management features, customer profile management capabilities, a payment gateway, an e-commerce merchant account with a processing bank to accept credit and debit card payments, etc.).

The first computing entity 12 and the second computing entity 14 interact via the interface means 18. The interface means 18 is one or more of: a direct link and a network connection. The direct link includes one or more of: a scanning device (e.g., video, camera, infrared (IR), barcode scanner, etc.), radio frequency (RF), and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the first computing entity 12 is a smart phone, the second computing entity 14 is a fixed merchant POS device (e.g., a POS register) and the interface means 18 is the fixed merchant POS device's scanning device (e.g., camera, barcode scanner, etc.). As another example, the first computing entity 12 is a smart phone, the second computing entity 14 is a fixed merchant POS device (e.g., a POS register) and the interface means 18 is the smart phone's scanning device (e.g., a front or back camera).

As another example, the first computing entity 12 is a smart phone, the second computing entity 14 is an online POS connection device (e.g., an e-commerce website or e-commerce mobile app) and the interface means 18 is a network connection. For example, a smart phone uses an internet browser application (via cellular or wireless internet connection) to access a merchant's e-commerce website. As another example, a smart phone uses a network connection to connect to an installed merchant e-commerce mobile app.

As yet another example, a combination of interface means 18 is possible. For example, the first computing entity 12 is a smart phone and the second computing entity 14 is an online POS connection device (e.g., an e-commerce website). The e-commerce website is accessed via a network connection interface means 18 on a computing device associated with the user of the first computing entity 12 (e.g., a laptop or desktop computer). The computing device displays information for use by the first computing entity's scanning device (e.g., front or back camera).

In an example of operation, the first computing entity 12 and the second computing entity 14 interact via the interface means 18 to initiate a digital asset-based interaction (also referred to herein as "interaction"). A digital asset-based interaction involves sending digital asset-based value from the first computing entity to the second computing entity (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that may differ from the digital asset the first computing entity 12 wishes to use in the interaction) and the first computing entity 12 provides a digital asset.

To initiate the interaction, the first computing entity 12 may display a unique scannable code to the second computing entity 14 when the interface means 18 is the second computing entity 14 scanning device. As another example, the first computing entity 12 may display and/or share an authorization key code when a code display interaction mode is disabled. As another example, the second computing entity 14 displays a unique scannable code for the first computing entity 12 when the interface means 18 is the first computing entity 12 scanning device. As another example, the second computing entity 14 may display and/or share an authorization key charge code when a code scan interaction mode is disabled. As another example, the first computing entity 12 connects to the second computing entity 14 via a network connection interface means 18 to initiate an interaction (e.g., when the second computing entity 14 is an e-commerce website). Modes of initiating interactions are discussed in more detail with reference to FIGS. 5-10.

During the interaction initiation, the first computing entity 12 sends first computing entity real-time information 24 to the digital asset-based interaction computing entity 16 via the digital asset-based interaction interface 25-1 and/or the second computing entity 14 sends second computing entity real-time information 26 to the digital asset-based interaction computing entity 16 via its digital asset-based interaction interface 25-2 (e.g., from requesting a scannable code, from scanning a scannable code, from receiving an authorization key code, from an e-commerce website checkout option selection, etc.).

The first computing entity real-time information 24 includes at least an identifier (e.g., a user ID) and an indication of a type of digital asset the user of the first computing entity wishes to use in a digital-asset based interaction with the second computing entity 14. The second computing entity real-time information 26 includes at least an identifier (e.g., a user ID, a merchant ID, etc.) and an indication of a desired asset format (e.g., a fiat currency, a cryptocurrency, etc.) for receiving assets in the digital asset-based interaction. One or more of the first computing entity real-time information 24 and the second computing entity real-time information 26 includes the amount involved in the digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the first and second computing entity real-time information, the digital asset-based interaction computing entity 16 initiates: 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction. For example, the reconciliation of the digital asset-based interaction with the digital asset backing computing entity 20 occurs over the course of minutes whereas the time frame of the real-time digital asset-based interaction takes a few seconds.

Within the nonreal-time digital asset-based interaction loop 30, when at least the first computing entity real-time information is received, the digital asset-based interaction computing entity 16 instructs the digital asset backing computing entity 20 to lock an amount of system digital asset associated with the digital asset-based interaction. When the digital asset-based interaction computing entity 16 locks the system digital asset, a rate quote for the amount of digital asset used by the first computing entity 12 is locked. An exchange rate is a price at which one digital asset can be exchanged for another. A rate quote is an exchange rate at a given point in time as determined by a digital asset exchange (e.g., cryptocurrency exchange) based on the buying and selling activity of the digital assets within the exchange. Locking a rate quote is discussed in more detail with reference to FIG. 2A.

Within the real-time digital asset-based interaction loop 28, when the digital asset-based interaction computing entity 16 receives an amount of digital asset from the first computing entity 12 to use in the digital asset-based interaction, a network acknowledgment (ACK) of the receipt of the amount of the digital asset is generated.

In an alternative embodiment, the ACK is generated after the system digital asset is locked and prior to receiving the amount of the digital asset from the first computing entity 12. For example, locking the system digital asset implies authorization of the interaction and the digital asset-based interaction computing entity 16 allows a time period (e.g., up to five minutes) prior to pulling digital assets from the first computing entity 12 (e.g., the first computing entity has time to add tip, split payment with another user, adjust type of digital asset used, etc.). The second computing entity 14 is provided a confirmation of this ACK. For example, when the second computing entity 14 is a POS computing device such as an attended register, this ACK may successfully end the in-person transaction such that a merchant and customer can part ways. However, the second computing entity 14 receives the payment up to a few minutes later. This embodiment is discussed in more detail with reference to FIG. 2A.

In another example, the ACK is generated after the amount of digital asset is received by the digital asset-based interaction computing entity 16 as previously discussed but the first computing entity 12 is provided a time period to provide the amount of the digital asset (e.g., the real-time digital asset-based interaction takes up to 5 minutes for the second computing entity 14 to confirm). For example, in a restaurant setting, where the second computing entity 14 is a merchant POS computing device, the merchant POS computing device may provide a first computing entity 12 a check to initiate a payment, however; the first computing entity is given time to add tip, split the bill, etc., prior to the merchant receiving funds.

If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28 (e.g., exchanging the digital asset to the desired asset format and sending the amount in the desired asset format to the second computing entity), the ACK is not generated, and the digital asset-based interaction is terminated. Within the nonreal-time digital asset-based interaction loop 30, when the ACK is not generated, the digital asset-based interaction computing entity 16 instructs the digital asset backing computing entity 20 to release the amount of locked system digital asset.

When the digital asset is managed by a distributed ledger technology (e.g., is a cryptocurrency), sending the amount of digital asset to the digital asset-based interaction computing entity 16 is a transaction added to the digital asset blockchain of the digital asset used by the first computing entity 12 (e.g., this information is published). However, other details related to the interaction (e.g., the identity of the second computing entity 14, transaction fees owed by the second computing entity 14, etc.) are managed privately by the digital asset-based interaction computing entity 16 off-chain. Therefore, the digital asset-based interaction system 10 keeps confidential second computing entity 14 related information (e.g., revenue, consumer spending behavior, etc.) and confidential first computing entity 12 related information (e.g., consumer identity of purchases, amount spent at a particular merchant, payees/merchants frequented, etc.) private (i.e., not published on a blockchain for anyone to see).

Continuing with the real-time digital asset-based interaction loop 28, when the ACK is generated and receipt of the amount of digital asset is received, the digital asset-based interaction computing entity 16 exchanges the amount of the digital asset received from the first computing entity 12 to an amount in the desired asset format. Digital asset exchange is done quickly (e.g., 30 seconds to a few minutes) to account for exchange rate volatility. The exchange can also be performed in real time on a credit-based account to eliminate any price volatility. The digital asset-based interaction computing entity 16 sends the amount in the desired asset format to the second computing entity 14 to complete the real-time portion of the digital asset-based interaction.

Continuing with the nonreal-time digital asset-based interaction loop 30, the digital asset-based interaction computing entity 16 verifies the amount of the digital asset received from the first computing entity 12. For example, the digital asset-based interaction computing entity 16 connects to a consensus network that verifies the amount of the digital asset received from the first computing entity 12. The consensus network implements a verification process that may take minutes to hours of time.

For example, in the Bitcoin blockchain, miners record new transactions into blocks that verify all previous transactions within the blockchain. At the filing of this application, it takes a miner ten minutes, on average, to write a block on the Bitcoin blockchain. The average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if the first computing entity 12 is using Bitcoin, the digital asset-based interaction computing entity 16 seeks a desired number of confirmations of the amount of the cryptocurrency received by the first computing entity 12 from the consensus network 16 (e.g., via Bitcoin miners). The transaction may not be verified by the digital asset-based interaction computing entity 16 for an hour or more. As such, the nonreal-time digital asset-based interaction loop 30 takes longer than the real-time digital asset-based interaction loop 28.

When the digital asset-based interaction computing entity 16 verifies the amount of the digital asset received by the first computing entity 12, the digital asset-based interaction computing entity 16 instructs the digital asset backing computing entity 20 to release the amount of system digital asset associated with the real-time digital asset interaction. When the digital asset-based interaction computing entity 16 does not verify the amount of the digital asset received by the first computing entity 12, the digital asset-based interaction computing entity 16 instructs the digital asset backing computing entity 20 to consume the amount of system digital asset associated with the real-time digital asset interaction.

For example, if fraudulent activity occurs (e.g., the first computing entity acts maliciously to spend at two merchants simultaneously, software of the asset management unit 22-1 is corrupted, etc.) the digital asset-based interaction computing entity 16 consumes the amount of system digital asset associated with the real-time digital asset interaction. As a specific example, if the first computing entity 12 attempts to double spend a transaction, the verification (e.g., the desired number of confirmations in a Bitcoin blockchain example) will not be received and the digital asset-based interaction computing entity 16 will not be able to verify the amount of the digital asset received by the first computing entity 12.

If the verification is not received, the digital asset-based interaction computing entity 16 withdraws (e.g., consumes) the amount of system digital asset locked by the digital asset backing computing entity 20 to cover the real-time digital asset interaction that occurred with the second computing entity 14. Consuming the amount of system digital asset means that the amount of system digital asset is transferred (e.g., via an on-chain transaction) from an address associated with the digital asset management computing entity 50 to an address associated with the digital asset-based interaction computing entity 16.

Figure 2:
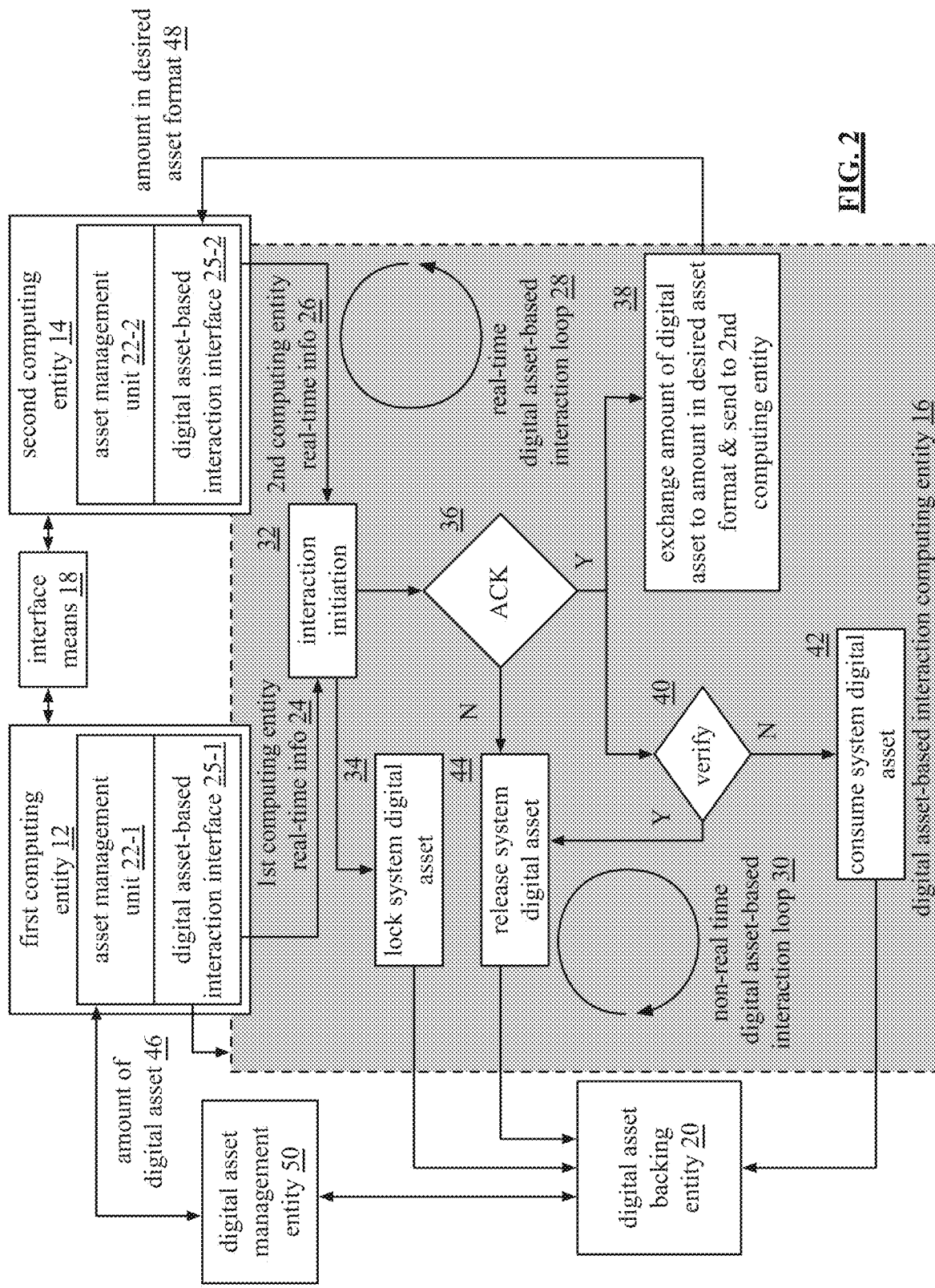
FIG. 2 is a flowchart of an example of a method for execution by a digital asset-based interaction computing entity of the digital asset-based interaction system.

FIG. 2 is a flowchart of an example of a method for execution by a digital asset-based interaction computing entity 16 of the digital asset-based interaction system 10 of FIG. 1. FIG. 2 includes a first computing entity 12, a second computing entity 14, a digital asset-based interaction computing entity 16, an interface means 18, a digital asset backing computing entity 20, and a digital asset management computing entity 50. The first and second computing entities 12 and 14 include asset management units 22-1 and 22-2 respectively and operate as discussed with reference to FIG. 1. The first and second computing entities 12 and 14 include asset management units 22-1 and 22-2 respectively that interface with the digital asset-based interaction computing entity 16 to facilitate digital asset-based interactions.

The second computing entity 14 may be a merchant computing entity that is operable to process payments from a computing entity and includes features tailored to the type of second computing entity 14 it is (e.g., a scanning device, a touchscreen, mobile payment features, online payment features, etc.).

The digital asset management computing entity 50 is associated with the digital asset backing computing entity 20 via an account and is operable to deposit system digital assets into its account to back digital asset-based interactions made by users of its associated asset management unit (e.g., asset management unit 22-1). The first computing entity 12 and the second computing entity 14 interact via the interface means 18 as discussed with reference to FIG. 1. For example, the interface means 18 is a scanning device of the first computing entity 12 and/or the second computing entity 14.

The method begins with step 32 where an interaction is initiated. An interaction is any activity involving sending digital asset-based value from the first computing entity to the second computing entity (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that differs from the digital asset the first computing entity 12 wishes to use in the interaction) and the first computing entity provides a digital asset. An interaction is initiated when the first and second computing entities interact via the interface means 18 as discussed with reference to FIG. 1.

During the interaction initiation, the digital asset-based interaction computing entity 16 receives first computing entity real-time information 24 and second computing entity real-time information 26 regarding the digital asset-based interaction between the first computing entity 12 sending digital assets and the second computing entity 14 accepting assets in a desired asset format.

For example, the first computing entity 12 sends first computing entity real-time information 24 to the digital asset-based interaction computing entity 16 via the digital asset-based interaction interface 25-1 of the asset management unit 22 and the second computing entity 14 sends second computing entity real-time information 26 to the digital asset-based interaction computing entity 16 via the digital asset-based interaction interface 25-2 (e.g., from either requesting or scanning a scannable code). As another example, the digital asset-based interaction interface of the first computing entity 12 or the second computing entity 14 may send the first and second computing entity real-time information 24 and 26 to the digital asset-based interaction computing entity 16 (e.g., the first computing entity 12 sends the second computing entity and the first computing entity real-time information 24 and 26).

The first computing entity real-time information 24 includes an identifier (e.g., a user ID) and a type of digital asset (e.g., a cryptocurrency) it wishes to use in a real-time digital asset-based interaction with the second computing entity 14. The second computing entity real-time information 26 includes an identifier (e.g., a merchant ID) and a type of desired/selected asset format (e.g., a fiat currency, another cryptocurrency) for receiving value from the first computing entity 12. One or more of the first computing entity real-time information 24 and the second computing entity real-time information 26 includes the amount of the real-time digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the real-time information 24-26, the digital asset-based interaction computing entity 16 initiates 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction.

The method continues with step 34 where, within the nonreal-time digital asset-based interaction loop 30, the digital asset-based interaction computing entity 16 instructs the digital asset backing computing entity 20 to lock an amount of system digital asset associated with the digital asset-based interaction. The amount of system digital asset locked may be based on one or more of an amount involved in the interaction, a type of interaction, a type of item involved in the interaction, the first computing entity 12 (e.g., a typical amount the first computing entity 12 spends, an account balance, etc.), and the second computing entity 14 (e.g., the type of merchant the second computing entity 14 is associated with, a type of goods the merchant sells, a default amount set by the merchant, etc.).

When the digital asset-based interaction computing entity 16 locks the system digital asset, a rate quote for the amount of digital asset used by the first computing entity 12 may be locked as discussed with reference to FIG. 1. The method continues with step 36 where a network acknowledgment (ACK) of the receipt of the amount of the digital asset is or is not generated. For example, when the digital asset-based interaction computing entity 16 receives an amount of digital asset 46 from the first computing entity 12 to use in the real-time digital asset-based interaction, the ACK is generated and the method continues to steps 38 and 40. If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the digital asset-based interaction terminates. Within the nonreal-time digital asset-based interaction loop 30, when the ACK is not generated, the method continues with step 44 where the digital asset-based interaction computing entity 16 instructs the digital asset backing computing entity 20 to release the amount of locked system digital asset.

Within the real-time digital asset-based interaction loop 28, when the ACK is generated, the method continues with step 38 where the digital asset-based interaction computing entity 16 exchanges (or connects to a digital asset exchange to exchange) the amount of the digital asset 46 received from the first computing entity 12 to an amount of assets in a desired asset format (e.g., fiat currency, a particular digital asset, etc.). Digital asset exchange is done quickly (e.g., 30 seconds to a few minutes) to account for exchange rate volatility. The digital asset-based interaction computing entity 16 sends the amount in the desired asset format 48 to the second computing entity 14 to complete the real-time digital asset-based interaction.

Within the nonreal-time digital asset-based interaction loop 30, when the ACK is generated at step 36, the method continues with step 40 where the digital asset-based interaction computing entity 16 verifies the amount of the digital asset 46 received from the first computing entity 12. For example, when the digital asset is cryptocurrency, the digital asset-based interaction computing entity 16 connects to a consensus network that verifies the amount of the cryptocurrency received from the first computing entity 12. The consensus network implements a verification process that may take minutes to hours of time. Other digital asset verification processes are possible and are based on the type of digital asset involved.

When the digital asset-based interaction computing entity 16 verifies the amount of the digital asset received by the first computing entity 12 at step 40, the method continues to step 44 where the digital asset-based interaction computing entity 16 instructs the digital asset backing computing entity 20 to release the amount of system digital asset locked for the digital asset-based interaction. When the digital asset-based interaction computing entity 16 does not verify the amount of the digital asset received by the first computing entity 12 at step 40, the method continues to step 42 where the digital asset-based interaction computing entity 16 instructs the digital asset backing computing entity 20 to consume the amount of system digital asset locked for the digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

Figure 2A:
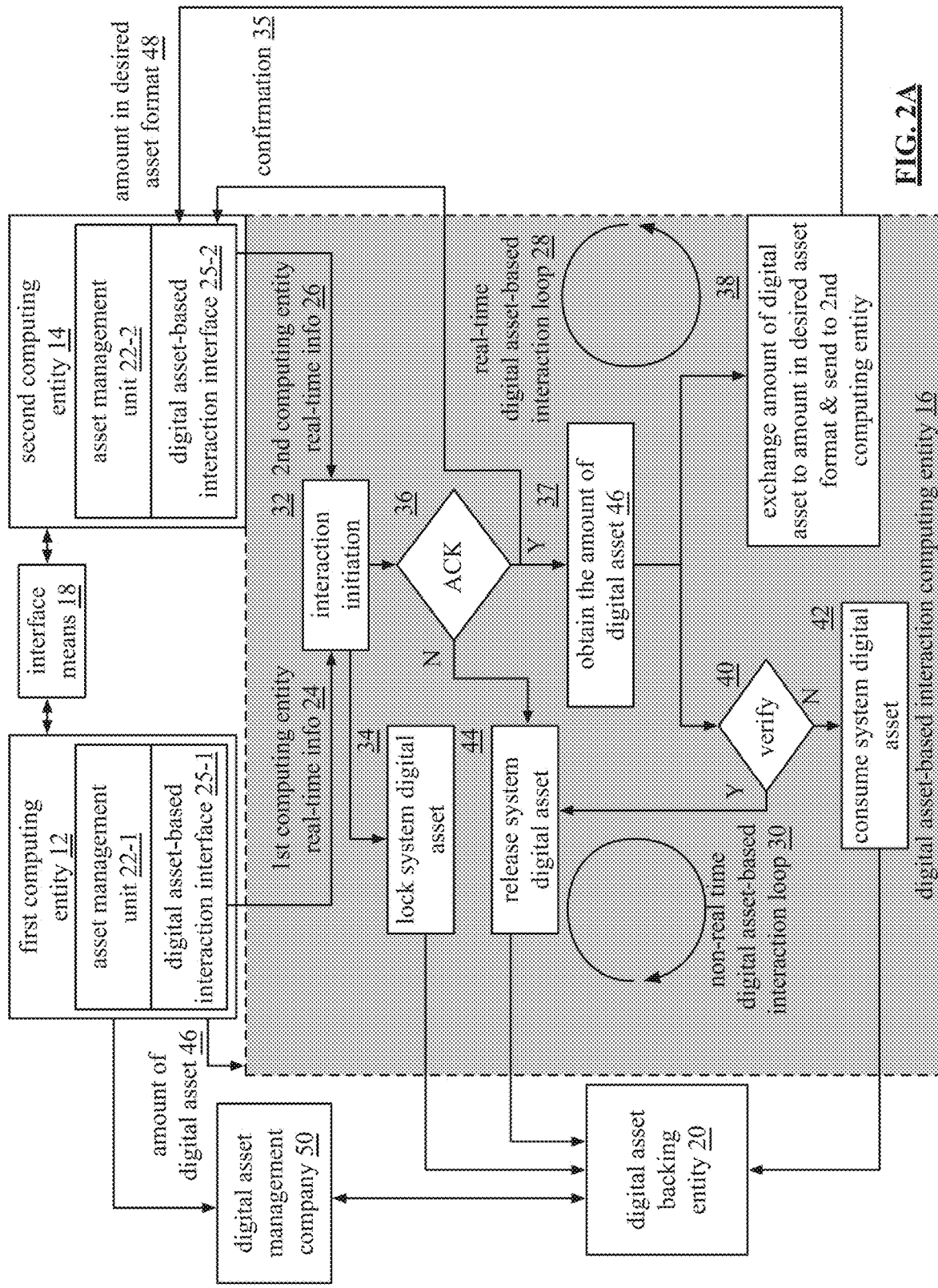
FIG. 2A is a flowchart of another example of a method for execution by a digital asset-based interaction computing entity of the digital asset-based interaction system.

FIG. 2A is a flowchart of an example of a method for execution by a digital asset-based interaction computing entity 16 of the digital asset-based interaction system 10 of FIG. 1. FIG. 2A is similar to the method of FIG. 2 except that the ACK at step 36 is generated after the system digital asset is locked but prior to receiving the amount of the digital asset from the first computing entity 12. Locking the system digital asset implies authorization of the interaction and the digital asset-based interaction computing entity 16 allows a time period (e.g., up to five minutes) prior to obtaining digital assets from the first computing entity 12 (e.g., the first computing entity has time to add tip, split the payment with another user, adjust type of digital asset used, etc.). The second computing entity 14 is provided a confirmation of this ACK. For example, when the second computing entity 14 is a POS computing device such as an attended register, this ACK may successfully end the in-person transaction such that the merchant and customer can part ways. However, the second computing entity 14 receives payment up to a few minutes after the in-person transaction.

When the digital asset-based interaction computing entity 16 locks the system digital asset, a rate quote for the amount of digital asset used by the first computing entity 12 is locked. The digital asset-based interaction computing entity 16 locks the rate quote based on a tolerance window acceptable to the user of the first computing entity 12. For example, the rate quote may be higher than a current rate quote if the window of time provided to receive funds is longer. The digital asset-based interaction computing entity 16 has knowledge of the fluctuations on the digital asset exchange used and is operable to adjust the rate quotes according to a digital asset's availability on the exchange. Further, once a user authorizes a digital asset-based interaction, the digital asset indicated in the interaction may be exchanged by the digital asset-based interaction computing entity 16 on credit (even if it has not been received yet) with the exchange to ensure a particular rate quote. Once the digital asset is received from the user, the accounting is balanced within the digital asset-based interaction computing entity 16.

As another example, the digital asset-based interaction computing entity 16 may utilize a smart contract based decentralized pool with a reserve of one or more smart contract compatible digital assets (e.g., Ethereum Request for Comment ("ERC20") tokens) for real-time digital asset exchanges to ensure a particular rate quote. For example, the digital asset-based interaction computing entity 16 exchanges smart contract compatible digital assets from the reserve (e.g., a substantial equivalent to the amount of digital asset used in the real-time digital asset-based interaction) for a substantially equivalent amount of assets in a desired asset format. When the amount of digital asset is received by the digital asset-based interaction computing entity 16, the digital asset-based interaction computing entity 16 is operable to exchange the amount of digital asset to the substantially equivalent amount of the smart contract compatible token used to cover the real-time digital asset exchange.

When the ACK is generated, the digital asset-based interaction computing entity 16 sends the second computing entity 14 a confirmation 35 of the real-time digital asset-based interaction. If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the confirmation 35 of the digital asset-based interaction is not sent.

Within the nonreal-time digital asset-based interaction loop 30, when the ACK is not generated, the method continues with step 44 where the digital asset-based interaction computing entity 16 instructs the digital asset backing computing entity 20 to release the amount of locked system digital asset. Within the real-time digital asset-based interaction loop 28, when the ACK is generated, the method continues with step 37 where, after a time period (e.g., up to 5 minutes), the amount of digital asset 46 is obtained. For example, an initial amount of digital asset is received at a time T1, and an additional amount of digital asset (e.g., tip is added) is received at a time T2 where the initial amount and the additional amount equal the amount of digital asset 46.

The method continues with step 38 where the digital asset-based interaction computing entity 16 exchanges (or connects to a digital asset exchange to exchange) the amount of the digital asset 46 received from the first computing entity 12 to an amount of asset in the desired asset format. Alternatively, if the locked system digital asset is used for the exchange, the digital asset-based interaction computing entity 16 exchanges the amount of the digital asset 46 received from the first computing entity 12 to an amount of system digital asset. The digital asset-based interaction computing entity 16 sends the amount in the desired asset format 48 to the second computing entity 14 to complete the real-time digital asset-based interaction.

Within the nonreal-time digital asset-based interaction loop 30, after the amount of digital asset 46 is obtained at step 37, the method continues with step 40 where the digital asset-based interaction computing entity 16 verifies the amount of the digital asset 46 received from the first computing entity 12. For example, the digital asset-based interaction computing entity 16 connects to a consensus network that verifies the amount of the digital asset received from the first computing entity 12. The consensus network implements a verification process that may take minutes to hours of time.

When the digital asset-based interaction computing entity 16 verifies the amount of the digital asset received by the first computing entity 12 at step 40, the method continues to step 44 where the digital asset-based interaction computing entity 16 instructs the digital asset backing computing entity 20 to release the amount of system digital asset locked for the digital asset-based interaction. When the digital asset-based interaction computing entity 16 does not verify the amount of the digital asset received by the first computing entity 12 at step 40, the method continues to step 42 where the digital asset-based interaction computing entity 16 instructs the digital asset backing computing entity 20 to consume the amount of system digital asset locked for the real-time digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

Figure 3:
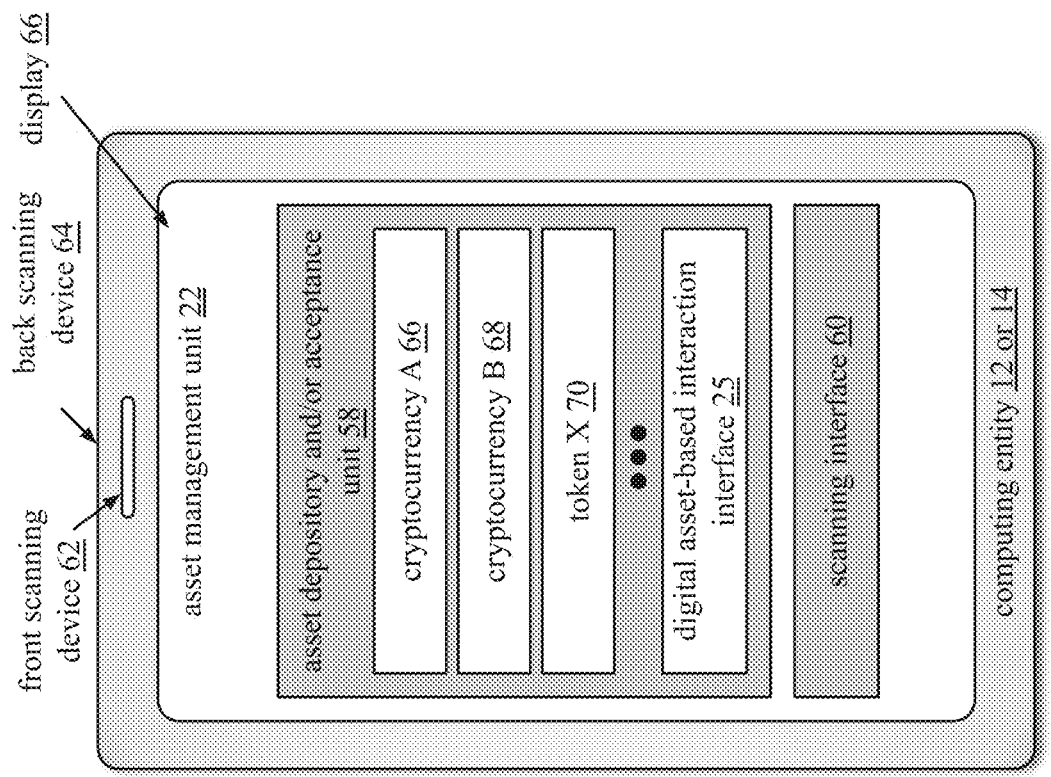
FIG. 3 is a schematic block diagram of an embodiment of a computing entity of a digital asset-based interaction system.

FIG. 3 is a schematic block diagram of an embodiment of a computing entity 12 or 14 of a digital asset-based interaction system. The computing entity 12 or 14 may be the first or second computing entity 12 or 14 of FIGS. 1-2A. The computing entity 12 or 14 includes an asset management unit 22, a display 66, a front scanning device 62 (e.g., a front camera), and a back scanning device 64 (e.g., a back camera). A scanning device may be a video device, a camera, an infrared (IR) device, a barcode scanner, etc. The computing entity 12 or 14 may have more or less scanning devices than shown. Further, the scanning devices may be located in different positions on the first computing entity 12 than what is shown. The display 66 may be a liquid crystal display (LCD), a light emitting diode (LED), and/or other type of display technology. The display 66 may include touchscreen functionality implemented by 5-wire resistive, thin film transistor (TFT), in-place switching (IPS), surface capacitive, surface acoustic wave (SAW), infrared, and/or any other type of touch sense and/or touchscreen technology.

The asset management unit 22 includes an asset depository and/or acceptance unit 58, a digital asset-based interaction interface 25, and a scanning interface 60. In this example, the asset depository and/or acceptance unit 58 is a digital wallet that stores and/or shows a representation of stored digital assets (e.g., when the digital assets are custodied by a digital asset management computing entity associated with the asset management unit 22). Here, the digital wallet stores cryptocurrency A 66, cryptocurrency B 68, and token X 70. The digital wallet could store more or less digital assets and may include additional features for digital asset management. For example, the digital wallet may include functions and/or features for trading, exchange, deposit, withdrawal, market information, digital asset news, etc. In another example, the asset depository and/or acceptance unit 58 is an interface for depositing digital assets to a network enabled smart contract.

In another example, the asset depository and/or acceptance unit 58 is POS hardware and/or software that facilitates receiving assets from other computing entities and may or may not store and/or manage digital assets. The asset depository and/or acceptance unit 58 may include a variety of existing payment processing features for processing payments within existing payment networks. When the computing entity 12 or 14 is a merchant application installed on a user device or merchant e-commerce website accessed by a user device, the asset depository and/or acceptance unit 58 may be an e-commerce platform with POS features.

The scanning interface 60 is coupled to one or more of the front and/or back scanning devices 62-64 and includes image capturing, image display, image processing, and/or encoding/decoding circuitry operable to capture, display, and/or analyze optically scanned, saved (e.g., a screenshot of a code, a code stored in a memory) or otherwise detected image data such as graphical coded representations of data (e.g., barcodes).

The digital asset-based interaction interface 25 interfaces with the digital asset-based interaction computing entity to facilitate digital asset-based interactions. The digital asset-based interaction interface 25 may be included in the asset depository and/or acceptance unit 58 as shown. For example, the asset depository and/or acceptance unit 58 is a digital wallet and a "pay" icon and/or button within the digital wallet asset depository and/or acceptance unit 58 links to the digital asset-based interaction interface 25. The digital asset-based interaction interface 25 may automatically open when the "pay" icon is selected (e.g., when the asset management unit 22 maintains an active link to the digital asset-based interaction computing entity 16) or the user of the computing entity may be prompted to sign into the digital asset-based interaction system (e.g., when the asset management unit 22 does not maintain an active link to the digital asset-based interaction computing entity 16).

As an alternative example, the digital asset-based interaction interface 25 may be included in the scanning interface 60 such that when a scan function is initiated by the scanning interface 60, the digital asset-based interaction interface 25 is accessed. A scan function may be initiated by selecting a scan icon or automatically when certain scannable codes are detected, and an automatic scan to interact function is enabled. The digital asset-based interaction interface 25 may automatically open when the scan function is initiated (e.g., when the asset management unit 22 maintains an active link to the digital asset-based interaction computing entity 16) or the user of the computing entity may be prompted to sign into the digital asset-based interaction system (e.g., when the asset management unit 22 does not maintain an active link to the digital asset-based interaction computing entity 16).

Figure 4:
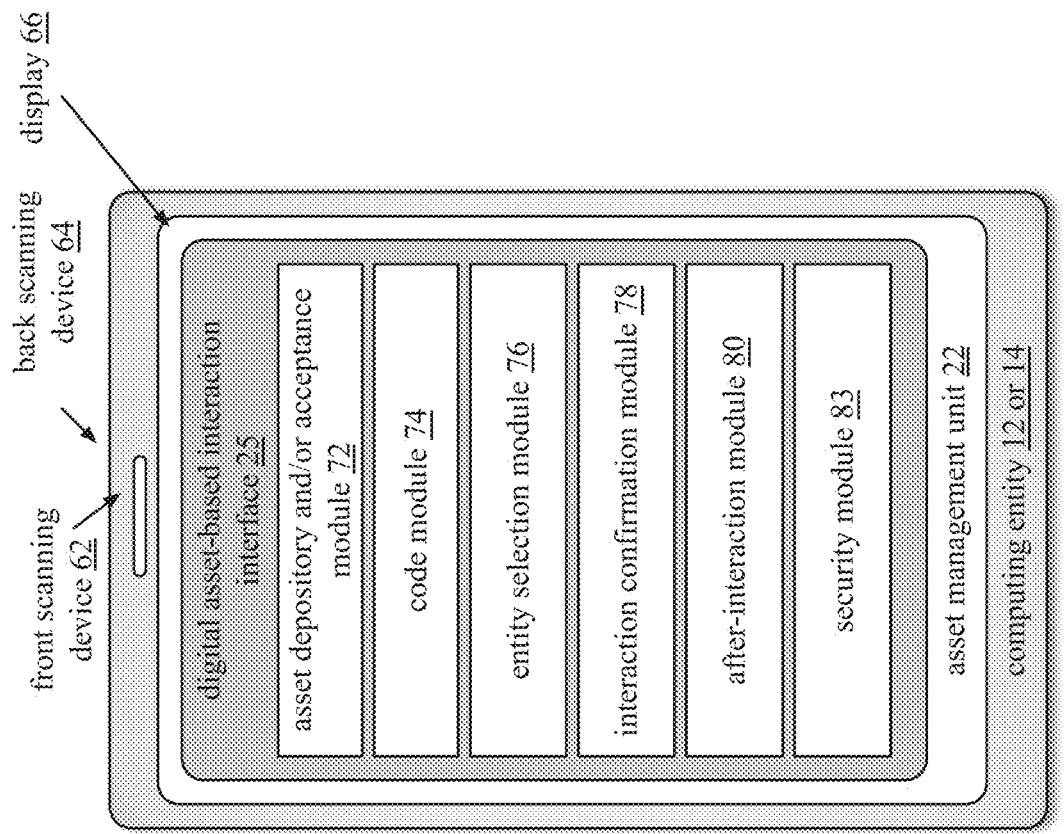
FIG. 4 is a schematic block diagram of another embodiment of a computing entity of a digital asset-based interaction system.

FIG. 4 is a schematic block diagram of an embodiment of a computing entity 12 or 14 of a digital asset-based interaction system that includes an asset management unit 22, a display 66, a front scanning device 62 (e.g., a front camera), and a back scanning device 64 (e.g., a back camera). FIG. 4 operates similarly to FIG. 3 and shows the digital asset-based interaction interface 25 of the asset management unit 22 (e.g., accessed via the asset depository and/or acceptance unit 58 or the scanning interface 60) in more detail.

FIG. 4 depicts modules of the digital asset-based interaction interface 25 that include an asset depository and/or acceptance unit module 72, a code module 74, an entity selection module 76, an interaction confirmation module 78, an after-interaction module 80, and a security module 83. More or less modules are possible. For example, the entity selection module 76 may not be necessary when the entity (e.g., merchant) selection functionality is included in other features and/or components. The asset depository and/or acceptance unit module 72 is coupled to the asset depository and/or acceptance unit of the asset management unit 22.

When the asset depository and/or acceptance unit is a digital wallet, the asset depository and/or acceptance unit module 72 displays balance information of the digital assets in the digital wallet (or a default digital asset selected for use in digital asset-based interaction system interactions) and is operable to communicate with the digital wallet to adjust digital assets (e.g., withdrawal, deposit, etc.) based on digital asset-based interaction system interactions. The balance information is based on rate quotes determined by a digital asset exchange used by the digital asset-based interaction computing entity at a point in time (e.g., a current exchange rate, an average exchange rate for a time period, etc.). The digital asset-based interaction computing entity is operable to exchange a variety of digital assets (e.g., fiat currency, cryptocurrency, etc.) and to facilitate exchange across jurisdictions (e.g., for foreign currency exchange). The balance information is updated as exchange rates fluctuate and/or based on a predetermined time (e.g., every 30 minutes, once a day, every time a user of the computing entity 12 or 14 opens digital asset-based interaction interface 25, etc.). The balance information may be shown in terms of US dollars or in any other desired digital asset.

The code module 74 is coupled to the scanning interface 60, the front scanning device 62, and/or the back scanning devices 64 of the computing entity 12 or 14 and includes software for detecting and analyzing scannable codes captured by the front and/or back scanning devices 62-64. The code module 74 is operable to receive codes (e.g., from the digital asset-based interaction computing entity), scan scannable codes (e.g., capture via the front and/or back optical scanner 62-64, digitize, and bring into a frame of reference), display scannable codes on the display 66, interpret codes to determine interaction information, and display the interaction information interpreted from the codes. The code module 74 may be a function of the scanning interface 60 that is tailored for scanning and interpreting scannable codes associated with digital asset-based interaction system interactions.

The entity selection module 76 is operable to connect to the digital asset-based interaction computing entity and/or a database associated with the digital asset-based interaction computing entity to receive digital asset-based interaction system entity data (e.g., a list of merchants and/or users associated with the digital asset-based interaction system). The entity selection module 76 may display a list of merchants and/or users that are associated with the digital asset-based interaction system for selection by the computing entity 12 or 14. The entity selection module 76 includes a search function to allow a user to search for a desired merchant and/or user. The displayed list of merchants and/or users may be based on location (e.g., nearby users and/or merchants are listed), category (e.g., restaurant merchants are listed), interaction data (e.g., users associated with a requested interaction are displayed), relationship (e.g., users that have been previously connected to and/or are authorized for contact), and/or availability (e.g., according to merchant hours of operation).

The interaction confirmation module 78 includes options for confirming an interaction and adding additional information (e.g., shipping information, bill splitting options, etc.) prior to confirming an interaction. The after-interaction module 80 includes after-interaction options that can be selected after an interaction is authorized and/or confirmed. For example, the after-interaction module 80 includes functions for an interaction adjustment (e.g., change wallets, change digital asset, etc.), adding additional information (e.g., a shipping address), bill splitting, and adding tip.

The security module 83 includes security mechanisms for authenticating the user and/or user activity of the computing entity 12 or 14 for a digital asset-based interaction. For example, the security module 83 uses facial recognition technology to perform a facial scan prior to initiating an interaction. As another example, the security module 83 stores and/or verifies usernames, passcodes, and/or keys related to authorization of digital asset-based interactions by the computing entity 12 or 14.

Figure 5:
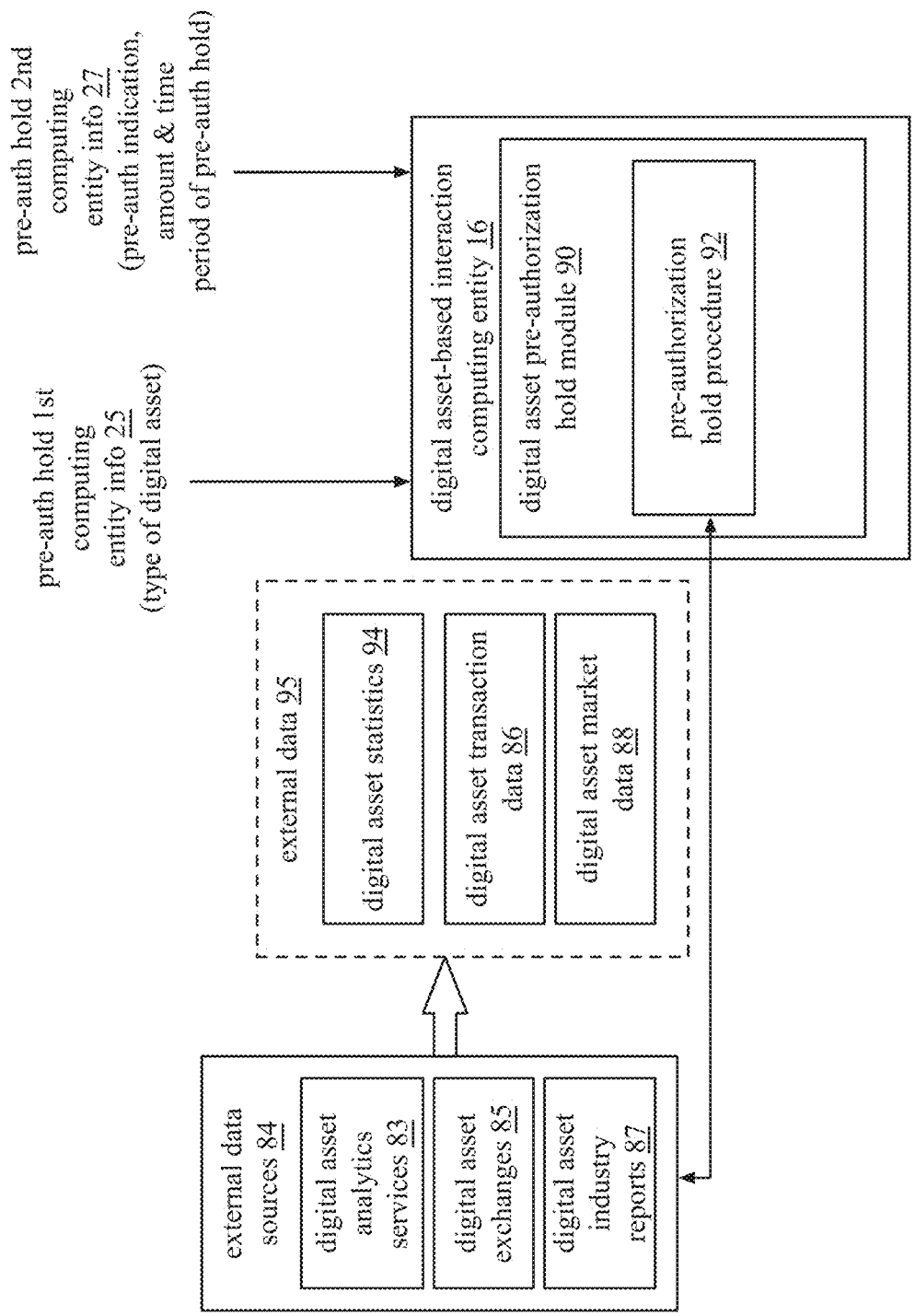
FIG. 5 is a schematic block diagram of an embodiment of a digital asset-based interaction computing entity of a digital asset-based interaction system.

FIG. 5 is a schematic block diagram of an embodiment of a digital asset-based interaction computing entity 16 of a digital asset-based interaction system. The digital asset-based interaction computing entity 16 includes a digital asset pre-authorization hold module 90 operable to determine a pre-authorization hold procedure 92 for a pre-authorization hold digital asset-based interaction. A pre-authorization hold digital asset-based interaction is a temporary hold (i.e., lock) on an amount of digital asset chosen by a first computing entity of the digital asset-based interaction to reserve digital assets for a future digital asset-based interaction with a second computing entity of the digital asset-based interaction system.

In traditional debit card and credit card transactions, pre-authorization holds (also known as a card authorizations, "pre-auths," and/or authorization holds) are temporary holds on a customer's credit or debit card to reserve funds for a future payment. When a customer provides a merchant with a credit or debit card for a payment, the merchant contacts the cardholder's issuing bank and requests an authorization code. If the authorization code indicates that the payment is approved (e.g., the account is in good standing, there are sufficient funds to cover the payment, etc.), the merchant can simply wait for the payment to be settled or the merchant can use a pre-authorization hold to temporarily lock funds for the payment to ensure that the payment settlement occurs. With merchants such as gas stations, hotels, car rental companies, and restaurants, a pre-authorization hold may be required to ensure that funds are available at a particular time (e.g., when the gas has been pumped, when a hotel check-out occurs, etc.). Authorization holds are a method used by merchants to protect against fraud, chargebacks, and unnecessary refunds. The temporary lock decreases the customer's available credit limit (credit card) or available funds (debit card) in anticipation of payment settlement.

Merchants such as gas stations, hotels, car rental companies, and restaurants may request a preauthorization hold for a predetermined amount that is higher or lower than the actual purchase amount. For example, a gas station may require a preauthorization hold of $1-$100 for a "pay at the pump" payment. If $100 is pre-authorized and only $50 of gas is pumped, the payment settlement occurs for $50 and the hold on the other $50 will be released after an amount of time. Typically, the time frame for a pre-authorization hold depends on a business merchant classification code (MCC).

In FIG. 5, a pre-authorization hold digital asset-based interaction has been initiated between a first computing entity of the digital asset-based interaction and a second computing entity digital asset-based interaction system. For example, the first computing entity is associated with a customer that has initiated a pre-authorization hold digital asset-based interaction with a second computing entity associated with a merchant (e.g., a hotel) that requires a pre-authorization hold to reserve funds for a future payment (e.g., upon check out).

The digital asset-based interaction computing entity 16 has received pre-authorization ("pre-auth") hold first computing entity information 25 and pre-authorization hold second computing entity information 27 (e.g., via a digital asset-based interaction interface of one or more of the first and second computing entity). The pre-authorization hold first computing entity information 25 includes an indication of a digital asset the first computing entity intends to use in the pre-authorization hold digital asset-based interaction and the pre-authorization hold second computing entity information 27 includes an indication that the pre-authorization hold is required, an amount of a pre-authorization hold, and a time period of the pre-authorization hold. The pre-authorization hold first computing entity information 25 and the pre-authorization hold second computing entity information 27 may include more information such as loyalty metadata, personal information, etc.

Due to pricing fluctuations of some digital assets, the value of the digital asset put on hold for a pre-authorization hold digital asset-based interaction could change dramatically prior to a future digital asset-based interaction (e.g., the future payment the pre-authorization hold is intended for). To account for pricing volatility, the digital asset pre-authorization hold module 90 of the digital asset-based interaction computing entity 16 analyzes external data 95 (e.g., via external data sources 84) pertaining to the type of digital asset selected by the first computing device, the amount of the pre-authorization hold, and the time period of the pre-authorization hold to determine a pre-authorization hold procedure 92. The pre-authorization hold procedure 92 dictates how the digital asset-based interaction computing entity 16 will process the pre-authorization hold digital asset-based interaction to account for digital asset pricing fluctuations.

The digital asset pre-authorization hold module 90 of the digital asset-based interaction computing entity 16 is operable to access external data sources 84 to obtain external data 95 regarding the type of digital asset the first computing entity wishes to use in the pre-authorization hold digital asset-based interaction. The external data sources 84 include one or more of digital asset analytics services 83 (e.g., accessed via a digital asset analytics service company's application programming interface (API)), digital asset exchanges 85, and digital asset industry reports 87 (e.g., reports generated by traders, analytics companies, etc., regarding the digital asset industry).

The external data 95 collected from the external data sources 84 includes one or more of digital asset statistics 94 regarding the digital asset, digital asset transaction data 86 regarding the digital asset, and digital asset market data 88 regarding the digital asset. The digital asset statistics 94 include one or more of a total amount of circulating digital assets, an exchange trade volume (e.g., total value of trading volume on major digital assets exchanges), digital asset blockchain information (e.g., blockchain size, average block size, average transactions per block, average payments per block, median confirmation time, average confirmation time, mempool size, etc.), and consensus network information (e.g., network difficulty, total hash rate, hash rate distribution, etc.).

The digital asset transaction data 86 includes one or more of an estimated transaction value (e.g., total estimated value of transactions on a particular blockchain), confirmed transactions per day, and a total value of all transaction outputs per day. The digital asset market data 88 includes one or more of a market price for the type of digital asset (e.g., an average market price across major digital asset exchanges), market capitalization (i.e., a total value of the digital asset in circulation), a market value to realized value, network value to transactions, and network value to transactions signals.

Based on the external data 95 (e.g., information gathered from the digital asset statistics 94, the digital asset transaction data 86, the digital asset market data 88, etc.) the amount of the pre-authorization hold, and the time period of the pre-authorization hold, the digital asset pre-authorization hold module 90 determines a pre-authorization hold procedure 92. The pre-authorization hold procedure 92 may include one or more of an over-collateralization procedure and an over-holding procedure. The over-collateralization procedure includes locking an amount of system assets in a certain amount more than the amount of the pre-authorization hold (i.e., an over-collateralization amount). The over-holding procedure includes locking an amount of the digital asset in a certain amount more than the amount of the pre-authorization hold (i.e., an over-holding amount).

Locking an amount of the digital asset means that the balance of the digital asset as seen by a user of the first computing entity is reduced by the locked amount, but the locked amount of digital assets has not yet been sent by and/or obtained from the first computing entity for a digital asset-based interaction. In another example, locking an amount of the digital asset means that the locked amount of digital assets is unusable (i.e., an attempt to move, transfer, spend, etc., the locked amount would be rejected) by the first computing entity but not necessarily shown as a reduction in digital asset balance to the user. Determining the pre-authorization hold procedure 92 for the pre-authorization hold digital-asset based interaction is discussed in more detail with reference to FIG. 6.

Figure 6:
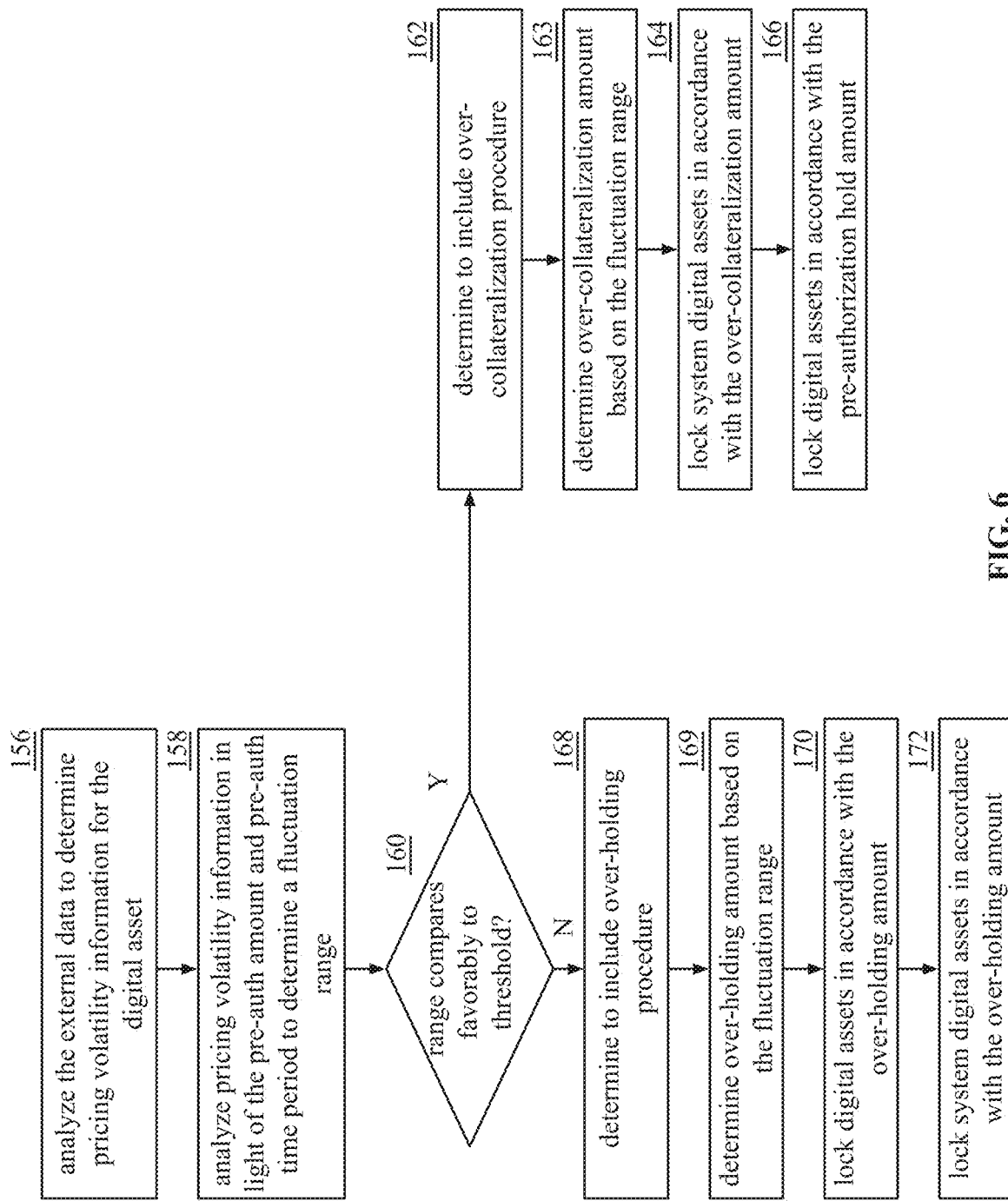
FIG. 6 is a flowchart of an example of a method of determining a pre-authorization hold procedure for a pre-authorization hold digital-asset based interaction.

FIG. 6 is a flowchart of an example of a method of determining a pre-authorization hold procedure for a pre-authorization hold digital-asset based interaction. After a pre-authorization hold digital-asset based interaction has been initiated between a first computing entity of the digital asset-based interaction and a second computing entity of the digital asset-based interaction system and the digital asset-based interaction computing entity has received pre-authorization hold first computing entity information and pre-authorization hold second computing entity information (as discussed with reference to FIG. 5), the method begins with step 156 where the digital asset pre-authorization hold module of the digital asset-based interaction computing entity analyzes external data (e.g., one or more of the digital asset statistics, the digital asset transaction data, and the digital asset market data obtained from external data sources) regarding the digital asset the first computing entity intends to use in the pre-authorization hold digital-asset based interaction to determine pricing volatility information pertaining to the digital asset.

For example, the digital asset pre-authorization hold module determines pricing volatility information that the type of digital asset is highly volatile and has been fluctuating greatly in price over the course of a single day.

The method continues with step 158 where the digital asset pre-authorization hold module analyzes the pricing volatility information in light of the pre-authorization hold amount and the pre-authorization hold time period to determine an estimated fluctuation range of the of digital asset. For example, the pricing volatility information of the digital asset indicated that the digital asset is highly volatile, the amount of the pre-authorization hold is low (e.g., $1) and the time period of the pre-authorization hold is short (e.g., 5 minutes). Based on the pricing volatility information, the pre-authorization hold amount, and the pre-authorization time period, the digital asset pre-authorization hold module determines an estimated fluctuation range of up to plus or minus 100% within the time period of the pre-authorization hold. For example, a 100% fluctuation range on a $1 hold amount is plus or minus $1. In another example, the amount of the pre-authorization hold is moderate to high (e.g., $200) and the time period of the pre-authorization hold is long (e.g., 3 days). Based on the pricing volatility information, the pre-authorization hold amount, and the pre-authorization time period, the digital asset pre-authorization hold module determines an estimated fluctuation range of up to plus or minus 300% within the time period of the pre-authorization hold. In that example, a 300% fluctuation range on a $200 hold amount is plus or minus $600.

The method continues with step 160 where the digital asset pre-authorization hold module determines whether the estimated fluctuation range compares favorably to a fluctuation threshold. The fluctuation threshold is an amount of pricing fluctuation deemed tolerable by an entity associated with collaterally backing the pre-authorization hold digital asset-based interaction (e.g., the digital asset management computing entity). A tolerable pricing fluctuation means that the entity is willing to risk a loss of the pricing fluctuation. In another embodiment, the amount of pricing fluctuation is deemed tolerable by the digital asset based-interaction computing entity where the digital asset based-interaction computing entity has a pool of funds (e.g., undistributed rewards) to use to offset small losses such as these. For example, the fluctuation threshold may be $1-$5. When fluctuation ranges are lower than the fluctuation threshold, they compare favorably to the fluctuation threshold. When fluctuation ranges are higher than the fluctuation threshold, they compare unfavorably to the fluctuation threshold.

When the fluctuation range compares favorably to the fluctuation threshold, the method continues with step 162 where the digital asset pre-authorization hold module determines to include an over-collateralization procedure in the pre-authorization hold procedure. For example, a fluctuation range of plus or minus $1 compares favorably to a fluctuation threshold of $5 (i.e., it is lower than $5) and the digital asset pre-authorization hold module includes the over-collateralization procedure in the pre-authorization hold procedure.

The method continues with step 163 where the digital asset pre-authorization hold module determines an over-collateralization amount based on the estimated fluctuation range. For example, the over-collateralization amount is substantially equal to the absolute value of the estimated fluctuation range.

The method continues with step 164 where the digital asset pre-authorization hold module locks an amount of system digital assets based on the over-collateralization amount. For example, when the estimated fluctuation range is plus or minus $1, the over-collateralization amount is substantially equal to the absolute value of the estimated fluctuation range (e.g., $1), and the pre-authorization hold amount is $1, the digital asset pre-authorization hold module locks $2 ($1 pre-authorization hold amount+$1 over-collateralization amount) worth of system digital assets to cover the pre-authorization hold.

The method continues with step 166 where the digital asset pre-authorization hold module locks an amount of digital assets based on the pre-authorization hold amount. For example, when the pre-authorization hold amount is $1, the digital asset pre-authorization hold module locks $1 of digital assets.

When the fluctuation range compares unfavorably to the fluctuation threshold, the method continues with step 168 where the digital asset pre-authorization hold module determines to include an over-holding procedure in the pre-authorization hold procedure. For example, a determined estimated fluctuation range of plus or minus $600 compares unfavorably to a fluctuation threshold of $5 and the digital asset pre-authorization hold module includes the over-holding procedure in the pre-authorization hold procedure.

The method continues with step 169 where the digital asset pre-authorization hold module determines an over-holding amount based on the estimated fluctuation range. For example, the over-holding amount is substantially equal to the absolute value of the estimated fluctuation range.

The method continues with step 170 where the digital asset pre-authorization hold module locks an amount of digital assets in accordance with the over-holding amount. For example, when the fluctuation range is plus or minus $600, the over-holding amount is substantially equal to the absolute value of the estimated fluctuation range (e.g., $600), and the pre-authorization hold amount is $200, the digital asset pre-authorization hold module locks $800 ($200 pre-authorization hold amount+$600 over-holding amount) worth of digital assets to cover the pre-authorization hold.

The method continues with step 172 where the digital asset pre-authorization hold module locks an amount of system digital assets in accordance with the over-holding amount. For example, when the amount of locked digital assets is worth $800, the digital asset pre-authorization hold module locks $800 worth of system digital assets as collateral. As such, with an over-holding procedure, an over-collateralization is also necessary to back the over-holding amount.

Figure 7:
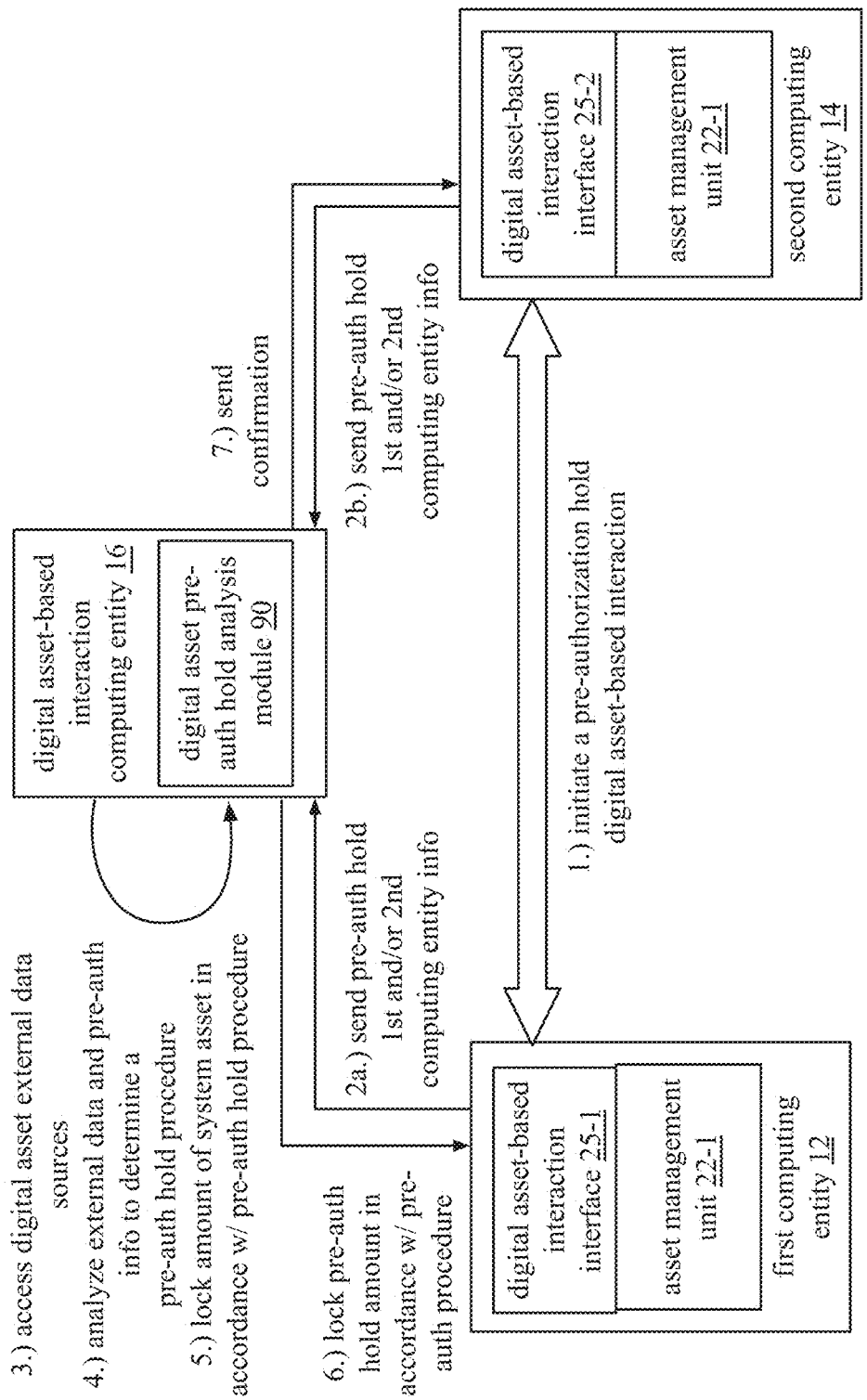
FIG. 7 is a flowchart of an example of a method for a pre-authorization hold digital asset-based interaction of a digital asset-based interaction system.

FIG. 7 is a flowchart of an example of a method for a pre-authorization hold digital asset-based interaction of a digital asset-based interaction system. FIG. 7 includes the first computing entity 12, the second computing entity 14, and the digital asset-based interaction computing entity 16 of a digital asset-based interaction system. The first computing entity 12 includes an asset management unit 22-1 that includes a digital asset-based interaction interface 25-1 that interfaces with the digital asset-based interaction computing entity 16 and may be coupled to one or more scanning devices. The second computing entity 14 includes a digital asset-based interaction interface 25-2 that interfaces with the digital asset-based interaction computing entity 16. For example, the second computing entity 14 is a merchant POS device that includes one or more scanning devices.

The digital asset-based interaction computing entity 16 includes the digital asset pre-authorization ("pre-auth") hold analysis module 90 that is operable to analyze information from external sources and pre-authorization hold information obtained during the interaction to determine a pre-authorization hold procedure when a pre-authorization hold is required by the interaction. The pre-authorization hold procedure dictates how the digital asset-based interaction computing entity 16 will process a pre-authorization hold to account for potential digital asset pricing fluctuations.

The method begins with step 1 where a pre-authorization hold digital-asset based interaction is initiated between the first computing entity 12 and the second computing entity 14. For example, the second computing entity 14 is an entity (e.g., a merchant) that requires a pre-authorization hold (e.g., a hotel, gas stations, car rental company, etc.) for a digital asset-based interaction. To initiate the interaction, the first computing entity 12 and second computing entity 14 interact via an interface means. For example, the first computing entity 12 may select to pay the second computing entity 14 via an entity selection module of the digital asset-based interaction interface 25-1 (e.g., via a network connection interface means). As another example, the second computing entity 14 is a POS register and one or more of the first computing entity 12 and the second computing entity 14 selects a digital asset-based payment option during checkout (e.g., via a scanning device, network connection, NFC, Bluetooth, etc., interface means). As another example, the second computing entity 14 is an e-commerce website, and a user of the first computing entity 12 selects a digital asset-based payment option on a checkout page of the e-commerce website (e.g., via a network connection interface means).

The method continues with steps 2a and 2b, where initiating the pre-authorization hold digital asset-based interaction sends pre-authorization hold first and second computing entity information to the digital asset-based interaction computing entity 16 (e.g., where the first computing entity sends pre-authorization hold first and/or second computing entity information and/or the second computing entity sends pre-authorization hold first and/or second computing entity information). The pre-authorization hold first computing entity information includes an identifier (e.g., a user ID) and a type of digital asset to use in a pre-authorization hold digital asset-based interaction and an after pre-authorization hold digital asset-based interaction with the second computing entity 14.

For example, when the first computing entity 12 selects a merchant, the user may also select a specific digital asset (e.g., Bitcoin) to use for digital asset-based interaction. Alternatively, a preferred digital asset is stored as a default payment method. The pre-authorization hold first computing entity information may include other metadata such as user loyalty information (e.g., a user's customer loyalty account number associated with the merchant), user account information associated with a merchant (e.g., username, password, etc.), personal information (e.g., address, name, etc.), shipping details, etc. The pre-authorization hold second computing entity information includes an identifier (e.g., a merchant ID), an indication that a pre-authorization hold is required for the digital asset-based interaction, an amount of the pre-authorization hold, and a time period of the authorization hold.

The method continues with step 3 where the digital asset-based interaction computing entity 16 accesses external data sources to obtain external data regarding the type of digital asset the first computing entity is using in the interaction. The external data sources include one or more of digital asset analytics services (e.g., accessed via a digital asset analytics service company's application programming interface (API)), digital asset exchanges, and digital asset industry reports (e.g., reports generated by traders, analytics companies, etc., regarding the digital asset industry). The external data collected from the external data sources includes one or more of digital asset statistics regarding the digital asset, digital asset transaction data regarding the digital asset, and digital asset market data regarding the digital asset.

The method continues with step 4 where the digital asset-based interaction computing entity 16 analyzes the external data from the external data sources, the amount of the pre-authorization hold, and the time period of the pre-authorization hold to determine a pre-authorization hold procedure.

The pre-authorization hold procedure includes one or more of an over-collateralization procedure and an over-holding procedure. The over-collateralization procedure includes analyzing the external data from the external data sources, the amount of the pre-authorization hold, and the time period of the pre-authorization hold (and/or other first and/or second computing entity real time information), to determine an over-collateralization amount. The over-collateralization amount is a certain amount more than the amount of the pre-authorization hold that accounts for pricing volatility associated with the type of digital asset. The digital asset-based interaction computing entity 16 locks the amount of system assets in accordance with the over-collateralization amount. The digital asset-based interaction computing entity 16 locks the amount of digital assets in accordance with the pre-authorization hold amount.

The over-holding procedure includes analyzing the external data from the external data sources, the amount of the pre-authorization hold, and the time period of the pre-authorization hold (and/or other first and/or second computing entity real time information), to determine an over-holding amount. The over-holding amount is a certain amount more than the amount of the pre-authorization hold that accounts for pricing volatility associated with the type of digital asset. The digital asset-based interaction computing entity 16 locks an amount of the digital asset in accordance with the over-holding amount. The digital asset-based interaction computing entity 16 locks the amount of system assets in accordance with the over-holding amount.

Locking an amount of the digital asset means that the balance of the digital asset as seen by a user of the first computing entity is reduced by the locked amount but the locked amount of digital assets has not yet been sent and/or obtained for the interaction. In another embodiment, locking an amount of the digital asset means that the balance of the digital asset is not reduced but the locked amount of digital assets is unusable by the first computing entity and the digital assets have not yet been sent and/or obtained for the interaction. Determining the pre-authorization hold procedure is discussed in more detail with reference to FIG. 6.

The method continues with step 5 where the digital asset-based interaction computing entity 16 locks an amount of system digital asset (e.g., that was deposited by the digital asset management computing entity associated with the asset management unit 22) in accordance with the pre-authorization hold procedure (e.g., an over-collateralization amount or an over-holding amount). Additionally, the amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with step 6 where the digital asset-based interaction computing entity 16 locks, via the digital asset-based interaction interface 25-1, an amount of digital assets stored by the first computing entity 12 in accordance with the pre-authorization hold procedure (e.g., an amount substantially equal to the pre-authorization hold digital asset-based interaction amount or over-holding amount).

The method continues with step 7 where the digital asset-based interaction computing entity 16 sends a confirmation to the second computing entity 14 that the pre-authorization hold digital asset-based interaction is successful (i.e., approved and/or authorized).

Figure 8:
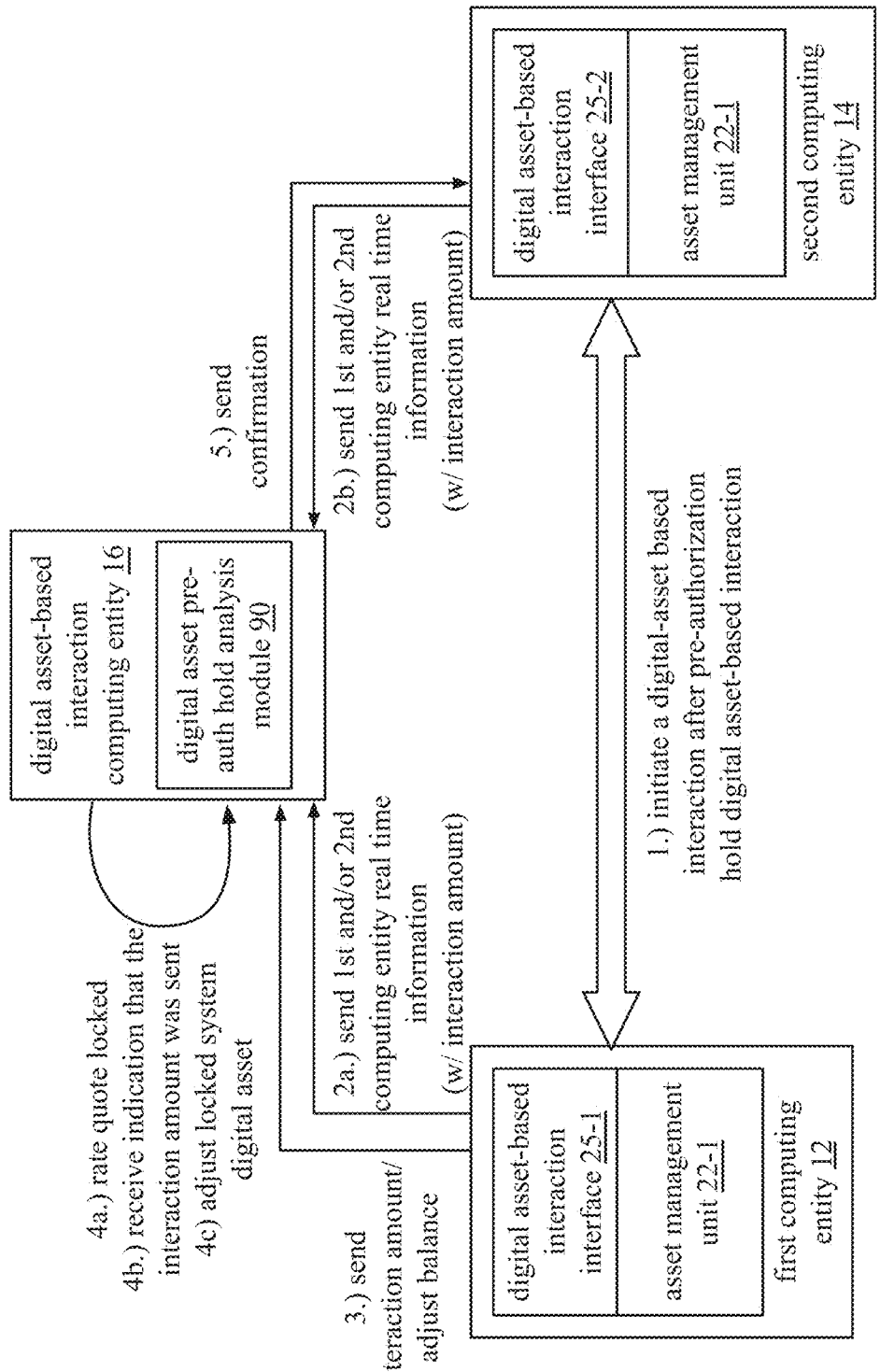
FIG. 8 is a flowchart of an example of a method for an after a pre-authorization hold digital asset-based interaction.

FIG. 8 is a flowchart of an example of a method for an after pre-authorization hold digital-asset based interaction. FIG. 8 includes the first computing entity 12, the second computing entity 14, and the digital asset-based interaction computing entity 16 of a digital asset-based interaction system and continues the example of FIG. 7 where when the pre-authorization hold digital asset-based interaction is over (e.g., after a period of time, upon an action by one or more of the first and/or second computing entity, etc.), an after pre-authorization hold digital asset-based interaction is initiated (e.g., a payment).

The method begins with step 1 where an after pre-authorization hold digital asset-based interaction is initiated. For example, a pre-authorization hold digital asset-based interaction was initiated when the user of the first computing entity initiated a pay at the pump service with a second computing entity 14 associated with a gas station merchant and after pumping gas, the after pre-authorization hold digital asset-based interaction of a payment occurs. As another example, a pre-authorization hold digital asset-based interaction was initiated when the user of the first computing entity checked into a hotel with a second computing entity 14 associated with the hotel merchant and upon checkout, the after pre-authorization hold digital asset-based interaction of a payment occurs.

To initiate the after pre-authorization hold digital asset based interaction, the first computing entity and second computing entity may interact with one another as shown (e.g., the first computing entity may select to confirm payment to the second computing entity 14 via the digital asset-based interaction interface 25-1) or the first and/or second computing entity 12 or 14 communicate directly with the digital asset-based interaction computing entity 16. For example, the first and/or second computing entity sends a notification of a time expiration of the time period of the pre-authorization hold and/or an indication of a particular action ending the time period of the pre-authorization hold (e.g., the tank of gas is full, and the gas pump clicks off) to the digital asset-based interaction computing entity 16 to initiate the after pre-authorization hold digital asset-based interaction.

The method continues with steps 2a and 2b where first and/or second computing entity real time information is sent to the digital asset-based interaction computing entity 16 (e.g., where the first computing entity sends first and/or second computing entity real time information and/or the second computing entity sends first and/or second computing entity real time information). The first and/or second computing entity real time information includes an indication that the pre-authorization hold is over, the amount of the after pre-authorization hold digital asset-based interaction, and a desired asset format (e.g., a fiat currency, a cryptocurrency, etc.) the second computing entity wishes to receive assets in. The first and/or second computing entity real time information may also include any first and/or second computing entity information previously sent in the pre-authorization hold digital-asset based interaction initiation (e.g., the type of the digital asset, etc.).

The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc. The second computing entity real-time information may include other information and/or metadata such as discounts offered and/or applied, shipping details (rates, method, etc.), bill splitting options, etc.

The method continues with step 3 where the first computing entity 12 sends the amount of the after pre-authorization hold digital asset-based interaction in the type of digital asset it wishes to use to the digital asset-based interaction computing entity 16 (e.g., based on a request from the digital asset-based interaction computing entity 16 and/or the second computing entity 14, based on scanning a scannable code presented by the second computing entity 14, based on a smart contract data input, etc.). Based on the amount of the after pre-authorization hold digital asset-based interaction in comparison to the pre-authorization digital asset-based interaction hold amount, the balance of the digital asset as seen by the user of the first computing entity is adjusted accordingly. For example, when the locked digital assets for the pre-authorization hold digital asset-based interaction exceeds the amount of the after pre-authorization hold digital asset-based interaction, the difference is unlocked and made available for use. When the amount of the after pre-authorization hold digital asset-based interaction is more than the pre-authorization hold digital asset-based interaction amount and an over-holding procedure was not used (or does not cover) the amount of the after pre-authorization hold digital asset-based interaction, the locked digital assets are unlocked and withdrawn as part of the amount of the after pre-authorization hold digital asset-based interaction sent.

The method continues with steps 4a-4c which may occur concurrently or in a different order (e.g., step 4b occurs slightly before step 4a). In step 4a, the digital asset-based interaction computing entity 16 locks the rate quote for the type of digital asset selected by the first computing entity 12 such that the rate quote presented to the first computing entity 12 (via the asset management unit 22-1 balance in US dollars or other digital asset) is what is used for the after authorization hold digital asset-based interaction even if the rate fluctuates during the interaction.

The method continues with step 4b where the digital asset-based interaction computing entity 16 receives an indication that the amount of the after authorization hold digital asset-based interaction was sent. The method continues with step 4c where the digital asset-based interaction computing entity 16 adjusts the lock on the amount of system digital asset as collateral for the after authorization hold digital asset-based interaction based on the amount of the after pre-authorization hold digital asset-based interaction. For example, when the amount of the after pre-authorization hold digital asset-based interaction is more than the pre-authorization hold digital asset-based interaction, and an over-collateralization procedure was not used (or does not cover) the amount of the after authorization hold digital asset-based interaction, additional system assets are locked as collateral for the after authorization hold digital asset-based interaction. When the amount of the after pre-authorization hold digital asset-based interaction is less than the pre-authorization hold digital asset-based interaction, an amount of system assets are unlocked as collateral for the after authorization hold digital asset-based interaction to adjust for the difference.

The method continues with step 5 where the digital asset-based interaction computing entity 16 sends a confirmation to the second computing entity 14 that the after authorization hold digital asset-based interaction is approved (i.e., authorized). The method continues with steps similar to steps 36-44 of FIGS. 2 and 2A.

Figure 9:
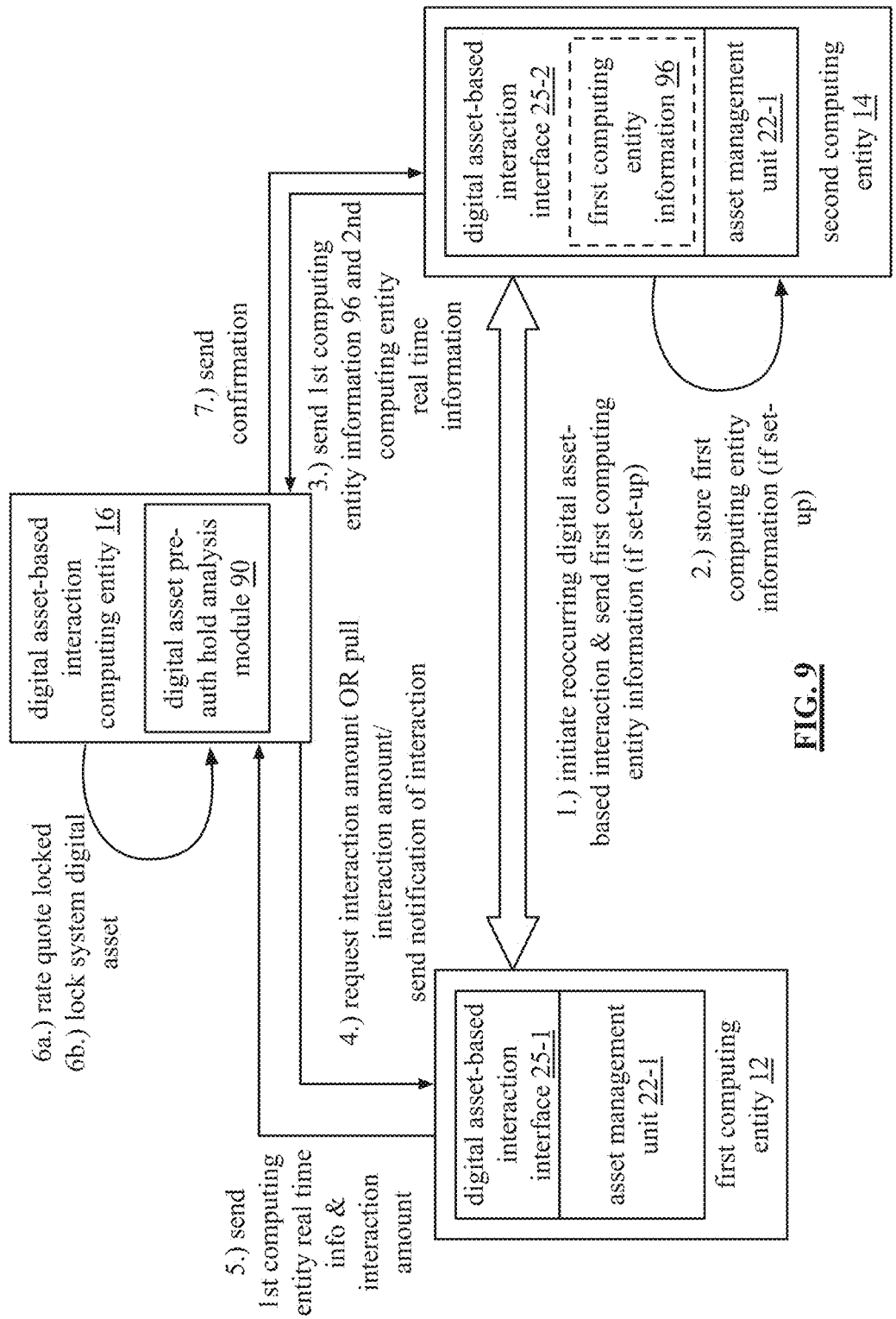
FIG. 9 is a flowchart of an example of a method for a reoccurring digital asset-based interaction of a digital asset-based interaction system.

FIG. 9 is a flowchart of an example of a method for a reoccurring digital asset-based interaction of a digital asset-based interaction system. FIG. 9 includes the first computing entity 12, the second computing entity 14, and the digital asset-based interaction computing entity 16 of a digital asset-based interaction system. The first computing entity 12 includes an asset management unit 22-1 including a digital asset-based interaction interface 25-1 that interfaces with the digital asset-based interaction computing entity 16 and is coupled to one or more scanning devices.

The second computing entity 14 includes a digital asset-based interaction interface 25-2 that interfaces with the digital asset-based interaction computing entity 16. In this example, the second computing entity 14 may be any type of a second computing entity 14 such as a merchant POS device, an e-commerce website, an e-commerce mobile application, etc.

During a reoccurring digital asset-based interaction set-up, the method begins with steps 1 and 2. After the reoccurring digital asset-based interaction has been set up, the method for future reoccurring digital asset-based interactions begins with step 3. During a reoccurring digital asset-based interaction set-up, the method begins with step 1 where a reoccurring digital asset-based interaction is initiated between a first and second computing entity. For example, the second computing entity 14 is an e-commerce website, and a user of the first computing entity 12 selects a reoccurring digital asset-based payment option on a checkout page of the e-commerce website. As another example, the reoccurring digital asset-based interaction set-up is a bill pay feature that allows the first computing entity to send bill payments to the second computing entity at specified times.

During the initiation, the first computing entity provides first computing entity information 96 to the second computing entity 14 regarding the reoccurring digital asset-based interaction. Alternatively, the first computing entity provides first computing entity information 96 to the digital asset-based interaction computing entity 16 and the digital asset-based interaction computing entity 16 provides the first computing entity information 96 to the second computing entity 14.

The first computing entity information 96 regarding the reoccurring digital asset-based interaction includes one or more of: a first computing entity identifier (ID), an address to send a digital asset-based interaction requests to (and/or pull funds from), authentication information (e.g., a public key of a private key pair of the first computing entity), personal information (e.g., a username and password), a communication method (e.g., email address), and details pertaining to the reoccurring digital asset-based interaction. The details pertaining to the reoccurring digital asset-based interaction may include a frequency of the reoccurring digital asset-based interaction (e.g., weekly, monthly, etc.), an amount of the reoccurring digital asset-based interaction (e.g., the same amount every time, a varying amount, an amount to be indicated at payment time, etc.), a type of digital asset to use in the digital asset-based interaction (e.g., the same type of digital asset each time, a digital asset to be indicated upon payment, etc.), a method of approving the reoccurring digital asset-based interaction (e.g., the first computing entity would like to approve each reoccurring digital asset-based interaction, the first computing entity pre-approves all future reoccurring digital asset-based interactions, etc.), and a method of reoccurring digital asset-based interaction notifications (e.g., the first computing entity wishes to receive a text message when a reoccurring digital asset-based interaction occurs).

The method continues with step 2 where the second computing entity 14 stores the first computing entity information 96 regarding the reoccurring digital asset-based interaction. After the reoccurring digital asset-based interaction set-up, and to perform a reoccurring digital asset-based interaction, the method continues with step 3 where the second computing entity sends at least a portion of the first computing entity information 96 (e.g., the amount of the digital asset-based interaction, authentication information, first computing entity identifying information, etc.) and second computing entity real time information to the digital asset-based interaction computing entity 16 in accordance with the details pertaining to the reoccurring digital asset-based interaction (e.g., at a scheduled time).

The second computing entity real-time information includes an identifier (e.g., a merchant ID) and a desired asset format (e.g., a fiat currency, a digital asset, etc.) it wishes to receive assets. The second computing entity real-time information may include other information and/or metadata such as discounts offered and/or applied, shipping details (rates, method, etc.), bill splitting options, a request for first computing entity information, etc.

The method continues with step 4 where the digital asset-based interaction computing entity 16 sends a request to the first computing entity 12 for the amount of the digital asset-based interaction (e.g., a push notification is sent to the first computing entity 12). In another embodiment, when the first computing entity information 96 includes future payment approval, a type of digital asset, and an address to pull funds from, the digital asset-based interaction computing entity 16 may automatically pull funds from the first computing entity 12 for the digital asset-based interaction. When the digital asset-based interaction computing entity 16 automatically pulls funds from the first computing entity 12, the digital asset-based interaction computing entity 16 may send a notification to the first computing entity 12 that the digital asset-based interaction was initiated, that it was successful, and/or whether more information is needed.

When the digital asset-based interaction computing entity 16 sends a request to the first computing entity 12 at step 4, the method continues with step 5 where the first computing entity 12 sends an amount of digital asset for the digital asset-based interaction to the digital asset-based interaction computing entity 16 and first computing entity real-time information.

The first computing entity real-time information includes an identifier (e.g., a user ID) and a type of digital asset to use in a real-time digital asset-based interaction with the second computing entity 14. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc.

When the digital asset-based interaction computing entity 16 automatically pulls the funds from the first computing entity 12 at step 4, step 5 is skipped, and the method continues to steps 6a and 6b.

The method continues with steps 6a-6b which may occur concurrently or in a different order (e.g., step 6b occurs slightly before step 6a). In step 6a, the digital asset-based interaction computing entity 16 locks the rate quote for the digital asset selected by the first computing entity 12 such that the rate quote presented to the first computing entity 12 (via the asset management unit 22-1 balance in US dollars or other digital asset) is what is used for the reoccurring digital asset-based interaction even if the rate fluctuates during the interaction.

The method continues with step 6b where the digital asset-based interaction computing entity 16 locks an amount of system digital asset (e.g., that was deposited by the digital asset management computing entity associated with the asset management unit 22) as collateral for the reoccurring digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with step 7 where the digital asset-based interaction computing entity 16 sends a confirmation to the second computing entity 14 that the reoccurring digital asset-based interaction is approved (i.e., authorized). The method continues with steps similar to steps 36-44 of FIGS. 2 and 2A.

Figure 10:
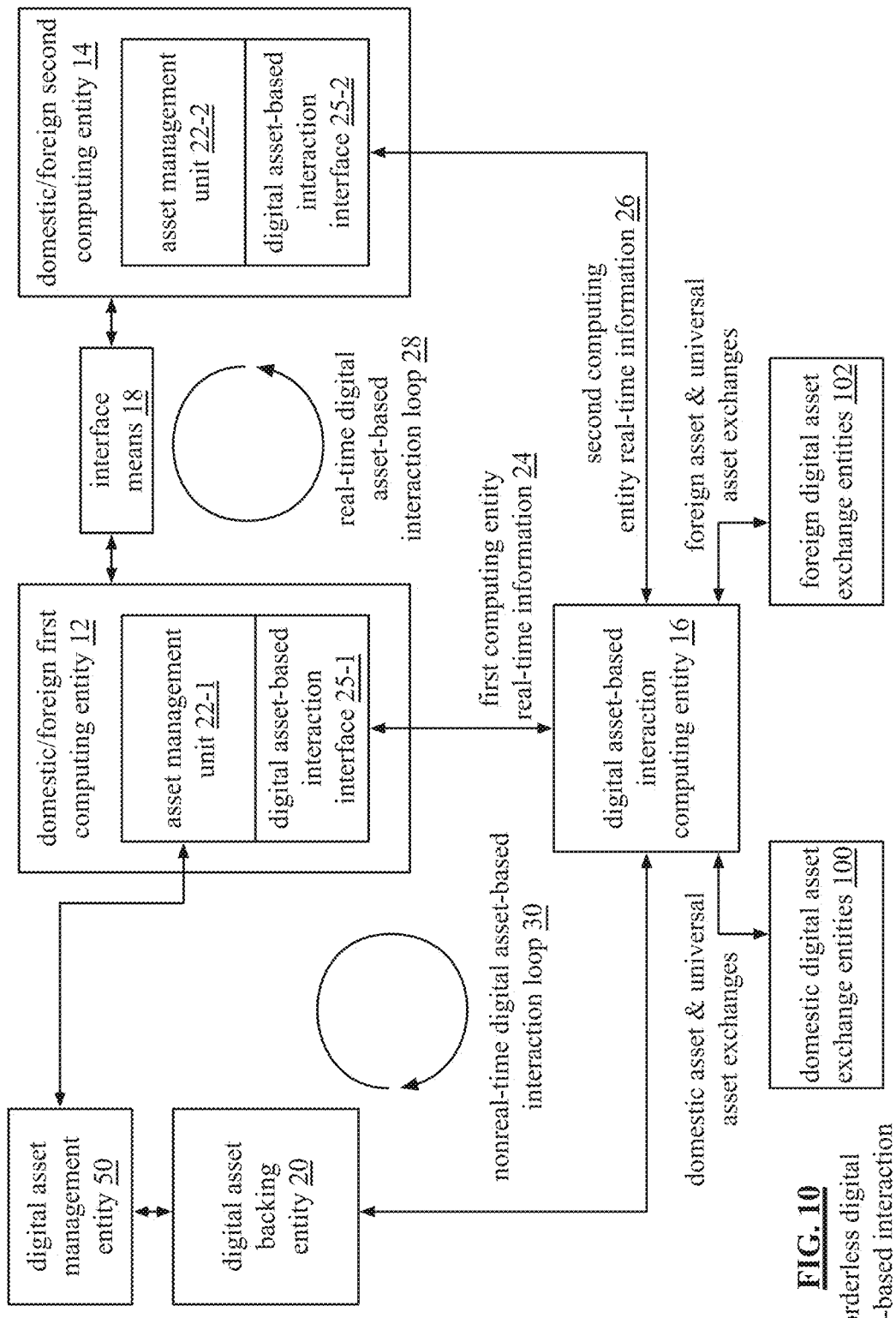
FIG. 10 is a schematic block diagram of an embodiment of a borderless digital asset-based interaction system.

FIG. 10 is a schematic block diagram of an embodiment of a borderless digital asset-based interaction system 98 that includes a first computing entity 12, a second computing entity 14, a digital asset-based interaction computing entity 16, an interface means 18, a digital asset backing computing entity 20, a digital asset management computing entity 50, one or more domestic digital asset exchange entities 100, and one or more foreign digital asset exchange entities 102.

The borderless digital asset-based interaction system 98 of FIG. 10 operates similarly to the digital asset-based interaction system 10 of previous Figures except that the borderless digital asset-based interaction system 98 includes the one or more domestic digital asset exchange entities 100 and the one or more foreign digital asset exchange entities 102 and the first and second computing entities 12 and 14 may be foreign or domestic computing entities.

The term domestic as referred to herein is referring to a jurisdiction that is native to the borderless digital asset-based interaction system 98 (e.g., the country in which the borderless digital asset-based interaction system 98 primarily operates). The term foreign as referred to herein is referring to a jurisdiction that is not native to the borderless digital asset-based interaction system 98. The borderless digital asset-based interaction system 98 is referred to as borderless because it is operable to immediately settle digital-asset based interactions across jurisdictions.

The digital asset-based interaction computing entity 16 is associated with one or more domestic digital asset exchange entities 100 and one or more plurality of foreign digital asset exchange entities 102. The one or more domestic digital asset exchange entities 100 are operable to exchange domestic digital assets from one type of domestic digital asset to another. The one or more foreign digital asset exchange entities 102 are operable to exchange foreign digital assets from one type of foreign digital asset to another.

Licensing, rules, and regulations for digital asset exchange occur jurisdictionally meaning some digital assets may be exchangeable for a particular digital asset in one jurisdiction (e.g., a country) but not exchangeable in another. For example, Ether (the cryptocurrency of the Ethereum blockchain) may be exchanged for U.S. dollars in the United States but outside of the United States it may not be accepted for exchange into a foreign fiat currency. Likewise, the United States may not have digital asset exchange entities licensed to exchange certain foreign digital assets for U.S. dollars or other digital assets.

In order to exchange multiple types of digital assets quickly across jurisdictions, the digital asset-based interaction computing entity 16 uses a universal digital asset exchange process. The universal digital asset is a digital asset that is widely accepted in multiple jurisdictions and by all the exchange entities associated with the borderless digital asset-based interaction system 98. For example, the universal digital asset is Bitcoin (BTC). When the digital asset-based interaction computing entity 16 receives an amount of digital assets that require the universal digital asset exchange process, the amount of digital assets is converted to a substantially equivalent amount of the universal digital asset by a corresponding digital asset exchange.

For example, when the first computing entity is a domestic computing entity engaging in digital asset-based interactions abroad with a foreign second computing entity accepting a foreign asset, the digital asset-based interaction computing entity 16 receives an amount of digital assets from the domestic computing entity, a domestic digital asset exchange entity of the one or more domestic digital asset exchange entities 100 exchanges the amount of digital assets to a substantially equivalent amount of the universal digital asset. The domestic digital asset exchange entity 100 or the digital asset-based interaction computing entity 16 sends the substantially equivalent amount of the universal digital asset to a corresponding foreign digital asset exchange entity of the one or more foreign digital asset exchange entities 102 where a foreign digital asset exchange entity is operable to convert the substantially equivalent amount of the universal digital asset to a substantially equivalent amount of the foreign asset. The foreign digital asset exchange entity 102 or the digital asset-based interaction computing entity 16 is then operable to provide the substantially equivalent amount of the foreign asset to the foreign second computing entity. Because each digital asset-based interaction is backed by system digital assets, the universal digital asset exchange process can occur very quickly to allow for immediate cross-jurisdiction settlements.

Figure 11:
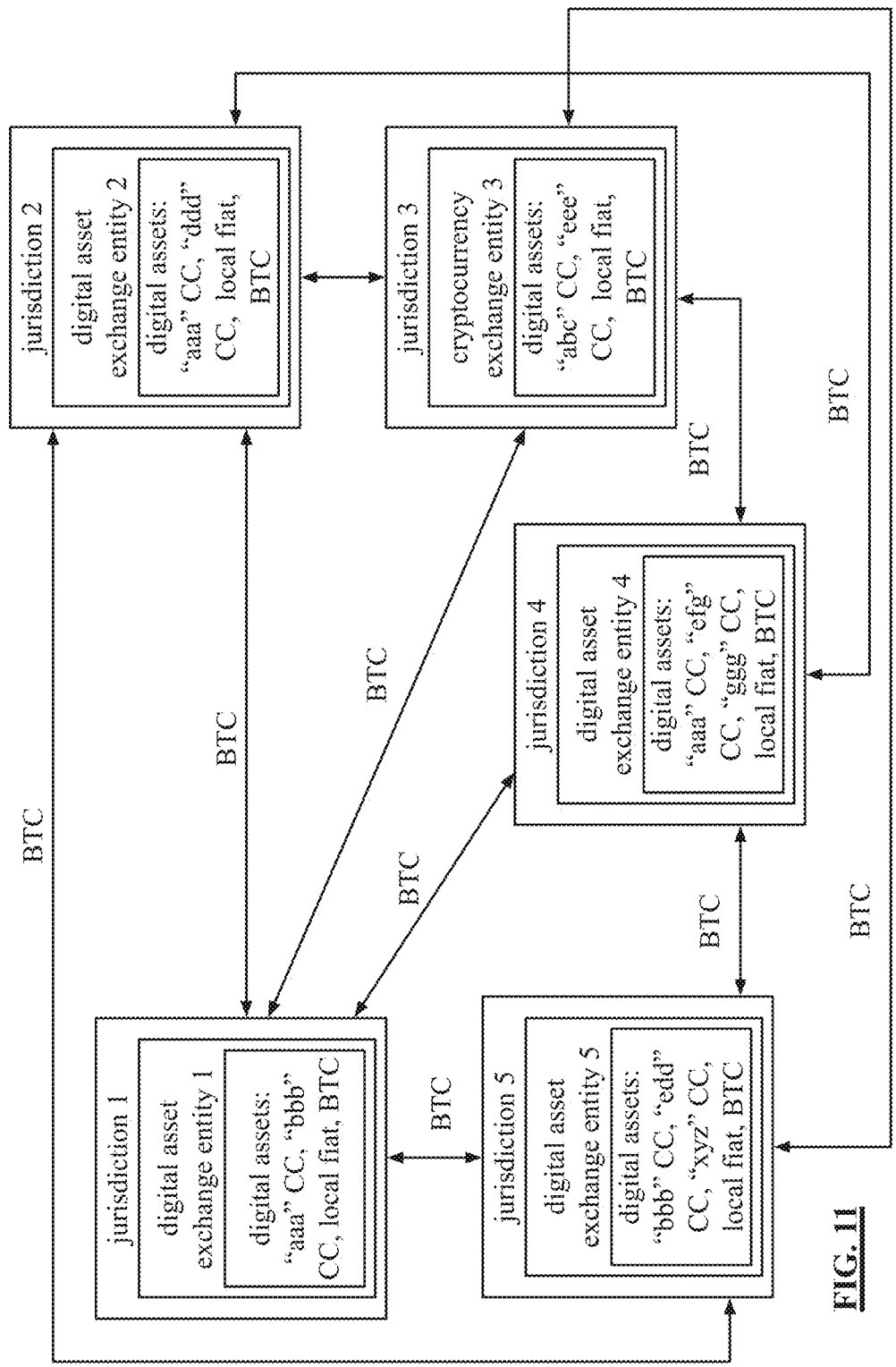
FIG. 11 is a schematic block diagram of an embodiment of a worldwide network of digital asset exchange devices of a borderless digital asset-based interaction system.

FIG. 11 is a schematic block diagram of an embodiment of a worldwide network of digital asset exchange entities of a borderless digital asset-based interaction system that includes digital asset exchange entities 1-5 located in jurisdictions 1-5. A digital asset exchange entity is operable to convert one or more digital assets to one or more other assets (e.g., fiat currency, cryptocurrencies, etc.). Licensing, rules, and regulations for digital asset exchange occur jurisdictionally meaning some digital assets may be exchangeable for other digital assets in one jurisdiction (e.g., a country) but not recognized for exchange in another.

For example, in jurisdiction 1, digital asset exchange entity 1 recognizes and is operable to convert the following digital assets: "aaa" cryptocurrency (CC), "bbb" cryptocurrency (CC), local fiat currency, and Bitcoin (BTC). In jurisdiction 2, digital asset exchange entity 2 recognizes and is operable to convert the following digital assets: "aaa" cryptocurrency (CC), "ddd" cryptocurrency (CC), local fiat currency, and Bitcoin (BTC). In jurisdiction 3, digital asset exchange entity 3 recognizes and is operable to convert the following digital assets: "abc" cryptocurrency (CC), "eee" cryptocurrency (CC), local fiat currency, and Bitcoin (BTC). In jurisdiction 4, digital asset exchange entity 4 recognizes and is operable to convert the following digital assets: "aaa" cryptocurrency (CC), "ggg" cryptocurrency (CC), local fiat currency, and Bitcoin (BTC). In jurisdiction 5, digital asset exchange entity 5 recognizes and is operable to convert the following digital asset: "bbb" cryptocurrency (CC), "edd" cryptocurrency (CC), "xyz" cryptocurrency (CC), local fiat currency, and Bitcoin (BTC).

While there is some overlap in what digital assets are recognized across jurisdictions (e.g., jurisdictions 1, 2, and 4 recognize "aaa" CC), a problem occurs when a first party from one jurisdiction wishes to initiate a digital asset-based interaction with a second party in another jurisdiction using a digital asset that is not recognized for exchange in the second party's jurisdiction. For example, a first party from jurisdiction 5 wishes to initiate a digital asset-based interaction with a second party from jurisdiction 1 using "xyz" CC. However, digital asset exchange entity 1 does not recognize or accept "xyz" CC for exchange.

To solve this problem, when a digital asset-based interaction occurs between a first party using a digital asset and a second party in a jurisdiction that cannot exchange the digital asset, the digital asset exchange entity in the first party's jurisdiction converts the digital asset to a universal digital asset (e.g., Bitcoin (BTC)). A digital asset exchange entity in the second party's jurisdiction is then operable to convert the universal digital asset to the desired asset format of the second party. For example, the digital asset exchange entity 5 converts the "xyz" CC to the universal digital asset Bitcoin (BTC) and sends the BTC to the digital asset exchange entity 1 (or to the digital asset-based interaction computing entity to send to the digital asset exchange entity 1). The digital asset exchange entity 1 converts the BTC to the desired asset format of the second party (e.g., local fiat currency).

This multiple-step conversion is referred to as the universal digital asset exchange process (or universal digital asset settlement layer) of the borderless digital asset-based interaction system. The universal digital asset exchange process is shown here as the arrows between jurisdictions indicating that the universal digital asset (e.g., Bitcoin (BTC)) can be exchanged across jurisdictions 1-5 for conversion to whatever assets are accepted by a particular jurisdiction. The universal digital asset exchange process allows for fast, trusted, and secure digital asset-based interactions worldwide.

Figure 12:
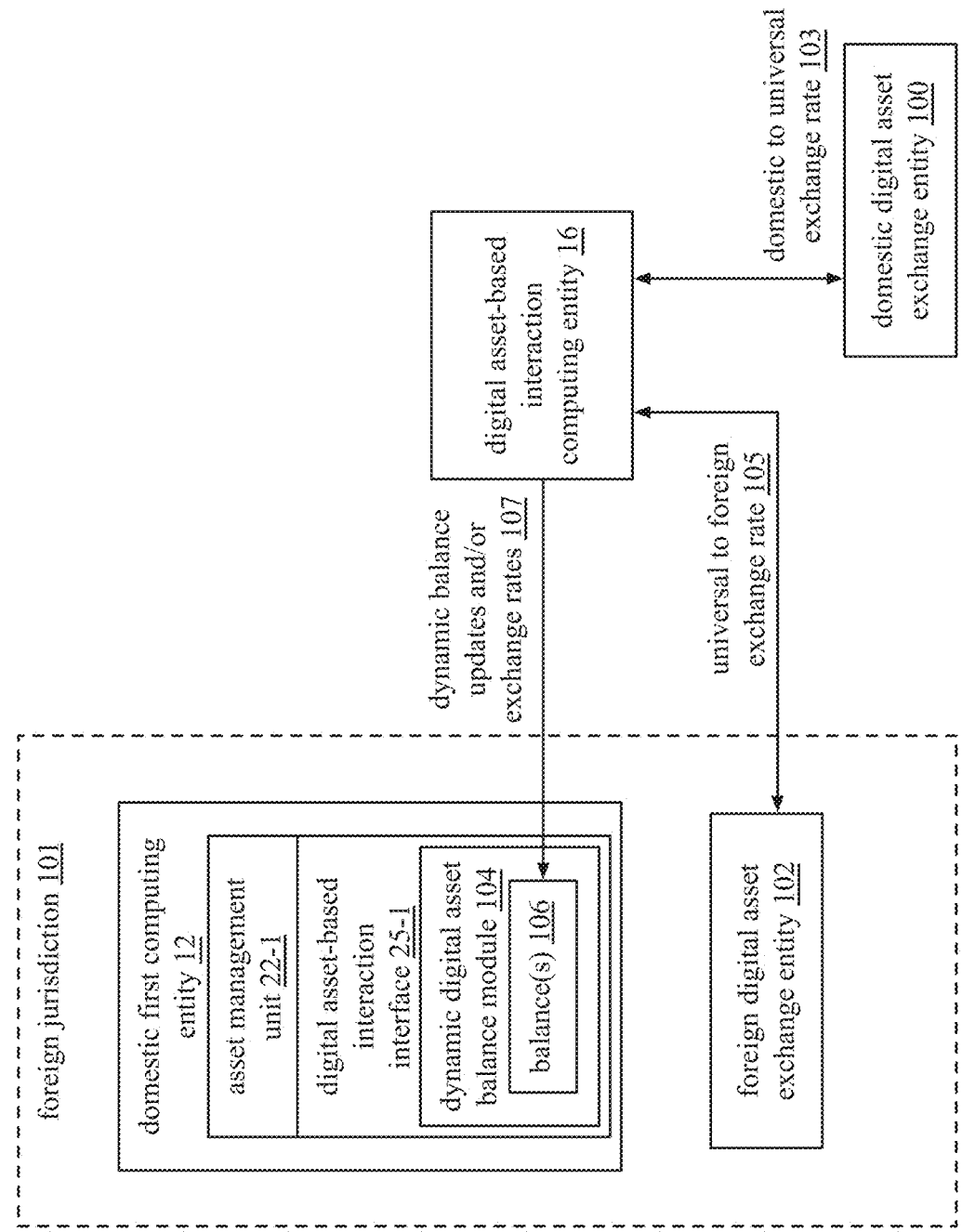
FIG. 12 is a schematic block diagram of another embodiment of a borderless digital asset-based interaction system.

FIG. 12 is a schematic block diagram of another embodiment of a borderless digital asset-based interaction system. A portion of the borderless digital asset-based interaction system is shown to include a domestic first computing entity 12, a digital asset-based interaction computing entity 16, a foreign digital asset exchange entity 102, and a domestic digital asset exchange entity 100. The domestic first computing entity 12 includes an asset management unit 22 including a digital asset-based interaction interface 25. The digital asset-based interaction interface 25 includes a dynamic digital asset balance module 104. The dynamic digital asset balance module 104 is operable to present digital asset balances 106 in terms of other digital assets as well as current exchange rates.

The digital asset-based interaction computing entity 16 is operable to provide dynamic balance updates and current exchange rate information to the domestic first computing entity 12 across jurisdictions by obtaining exchange rate information from various digital asset exchange entities.

In this example, the domestic first computing entity 12 is located in a foreign jurisdiction 101. The digital asset-based interaction computing entity 16 is operable to detect that the domestic first computing entity 12 is located in the foreign jurisdiction 101 (e.g., by GPS information, by an initiated interaction in the foreign jurisdiction 101, by a user input, etc.). When the domestic first computing entity 12 is detected in the foreign jurisdiction 101, the digital asset-based interaction computing entity 16 determines to provide dynamic balance updates and/or exchange rates 107 to the domestic first computing entity 12 pertaining to the foreign jurisdiction 101. The digital asset-based interaction computing entity 16 may determine to provide dynamic balance updates based on a default setting (e.g., every time a computing entity is in a new jurisdiction, provide balance updates pertaining to that jurisdiction), a user preference, a request, an initiated interaction, etc.

When a digital asset stored by the domestic first computing entity 12 is not recognized for exchange in the foreign jurisdiction 101, the digital asset-based interaction computing entity 16 connects to a domestic digital asset exchange entity 100 to determine a domestic digital asset to a universal digital asset exchange rate 103. Based on the domestic digital asset to a universal digital asset exchange rate 103 and an amount of the digital asset, the digital asset-based interaction computing entity 16 determines a digital asset balance in terms of the universal digital asset.

The digital asset-based interaction computing entity 16 connects to a foreign digital asset exchange entity 102 to determine a universal digital asset to foreign asset exchange rate 105. Based on the universal digital asset to foreign asset exchange rate 105 and the digital asset balance in terms of the universal digital asset, the digital asset-based interaction computing entity 16 determines a digital asset balance in terms of the foreign asset. The dynamic balance updates and/or exchange rates 107 include one or more of the domestic digital asset to a universal digital asset exchange rate 103, the digital asset balance in terms of the universal digital asset, a universal digital asset to foreign asset exchange rate 105, a digital asset balance in terms of the foreign asset.

When the digital asset is recognized for exchange in the foreign jurisdiction 101, the digital asset-based interaction computing entity 16 connects to the foreign digital asset exchange entity 102 to determine a digital asset to foreign asset exchange rate and calculates a digital asset balance in terms of the foreign asset. The balances are dynamically updated to reflect current exchange rates (e.g., every few minutes, each time a user opens the dynamic digital asset balance module 104, upon initiation of an interaction, upon request, etc.).

Figure 13:
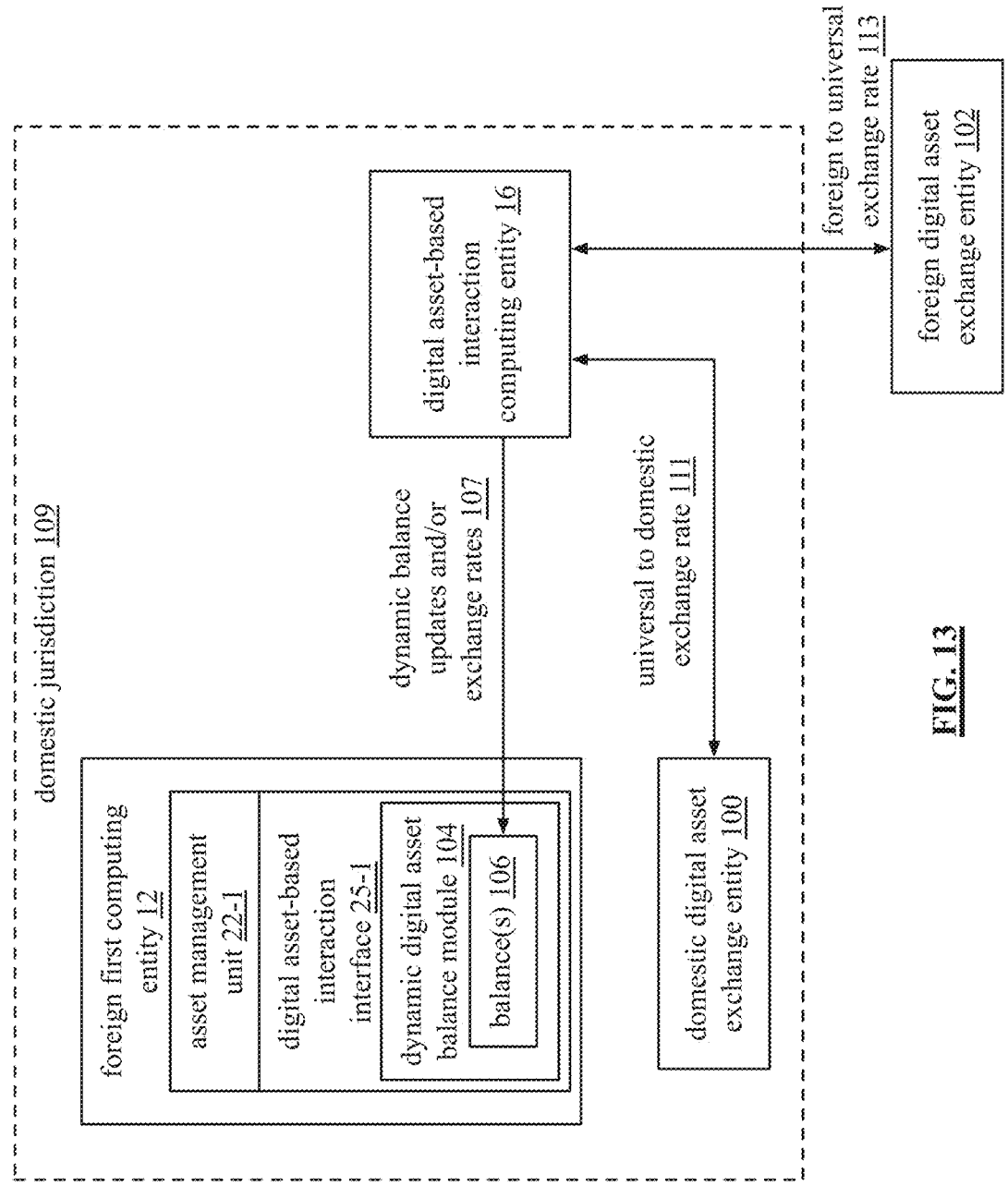
FIG. 13 is a schematic block diagram of another embodiment of a borderless digital asset-based interaction system

FIG. 13 is a schematic block diagram of another embodiment of a borderless digital asset-based interaction system. A portion of the borderless digital asset-based interaction system is shown to include a foreign first computing entity 12, a digital asset-based interaction computing entity 16, a foreign digital asset exchange entity 102, and a domestic digital asset exchange entity 100. The borderless digital asset-based interaction system of FIG. 13 operates similarly to the borderless digital asset-based interaction system of FIG. 12 except that a foreign first computing entity is shown in a domestic jurisdiction 109.

The foreign first computing entity 12 includes an asset management unit 22 including a digital asset-based interaction interface 25. The digital asset-based interaction interface 25 includes a dynamic digital asset balance module 104. The dynamic digital asset balance module 104 is operable to present digital asset balances 106 in terms of other digital assets as well as current exchange rates. The digital asset-based interaction computing entity 16 is operable to provide dynamic balance updates and current exchange rate information to the foreign first computing entity 12 across jurisdictions by obtaining exchange rate information from various digital asset exchange entities.

The digital asset-based interaction computing entity 16 is operable to detect that the foreign first computing entity 12 is located in the domestic jurisdiction 103 (e.g., by GPS information, by an initiated interaction in the domestic jurisdiction 109, by a user input, etc.). When the foreign first computing entity 12 is detected in the domestic jurisdiction 109, the digital asset-based interaction computing entity 16 determines to provide dynamic balance updates and/or exchange rates 107 to the foreign first computing entity 12 pertaining to the domestic jurisdiction 109. The digital asset-based interaction computing entity 16 may determine to provide dynamic balance updates based on a default setting (e.g., every time a computing entity is in a new jurisdiction, provide balance updates pertaining to that jurisdiction), a user preference, a request, an initiated interaction, etc.

When a digital asset stored by the foreign first computing entity 12 is not recognized for exchange in the domestic jurisdiction 109, the digital asset-based interaction computing entity 16 connects to a foreign digital asset exchange entity 102 to determine to determine foreign asset to universal digital asset exchange rate 113. Based on the foreign asset to universal digital asset exchange rate 113 and the amount of the digital asset, the digital asset-based interaction computing entity 16 determines a digital asset balance in terms of the universal digital asset.

The digital asset-based interaction computing entity 16 connects to a domestic digital asset exchange entity 100 to determine a universal digital asset to domestic asset exchange rate 111. Based on the universal digital asset to domestic asset exchange rate 111 and digital asset balance in terms of the universal digital asset, the digital asset-based interaction computing entity 16 determines a digital asset balance in terms of the domestic asset.

The dynamic balance updates and/or exchange rates 107 include one or more of the foreign asset to universal digital asset exchange rate 113, the digital asset balance in terms of the universal digital asset, the universal digital asset to domestic asset exchange rate 111, and the digital asset balance in terms of the domestic asset.

When the digital asset is recognized for exchange in the domestic jurisdiction 109, the digital asset-based interaction computing entity 16 connects to the domestic digital asset exchange entity 100 to determine a digital asset to domestic asset exchange rate and calculates a digital asset balance in terms of the domestic asset. The balances are dynamically updated to reflect current exchange rates (e.g., every few minutes, each time a user opens the dynamic digital asset balance module 104, upon initiation of an interaction, upon request, etc.).

Figure 14B:
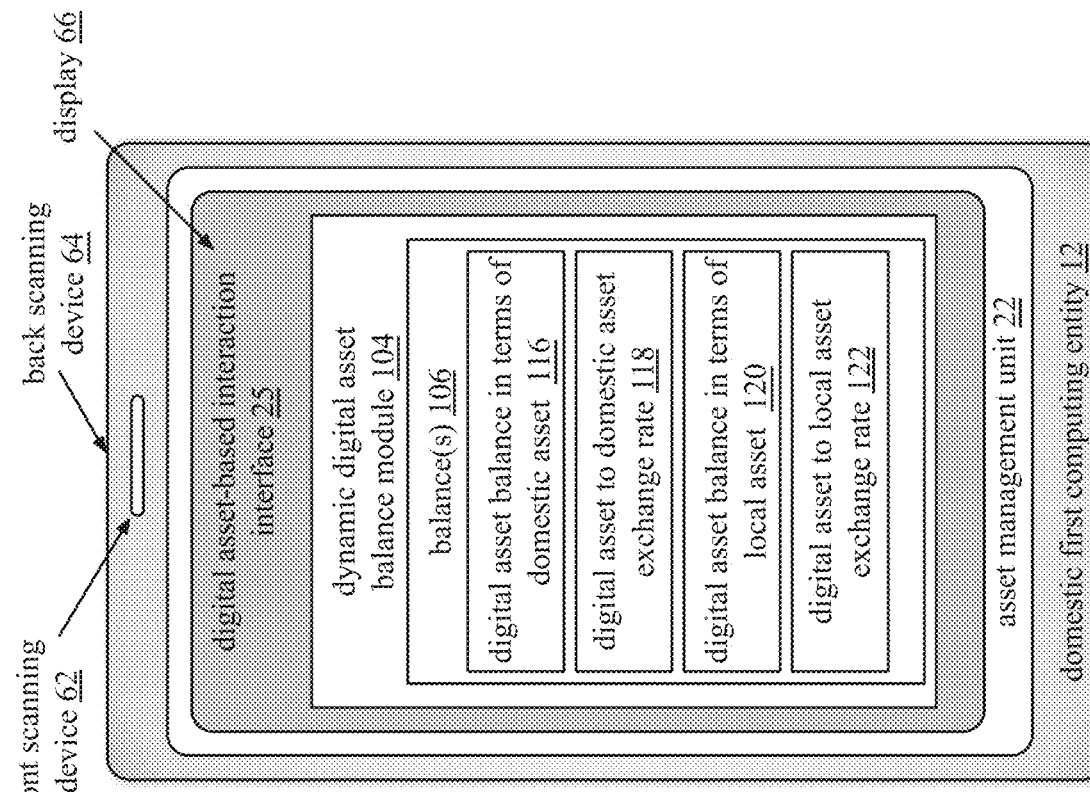
FIGS. 14A-14B are schematic block diagrams of an embodiment of a first computing entity of the borderless digital asset-based interaction system.
Figure 14A:
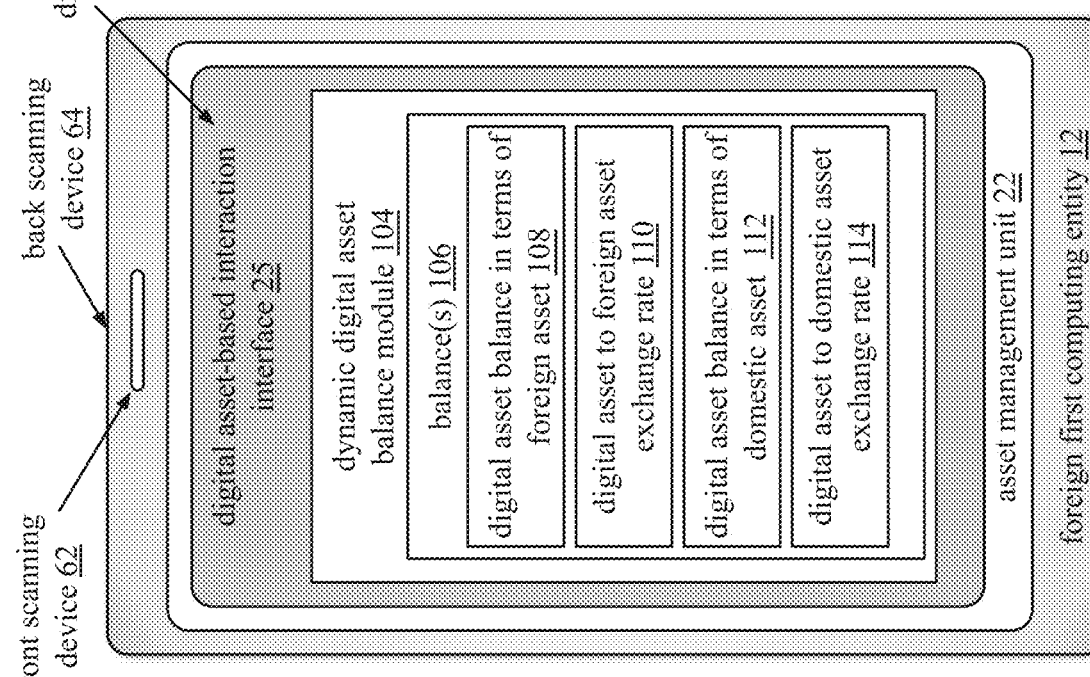

FIGS. 14A-14B are schematic block diagrams of an embodiment of a first computing entity 12 of the borderless digital asset-based interaction system. FIG. 14A depicts a foreign first computing entity 12 within a domestic jurisdiction and FIG. 14B depicts a domestic first computing entity 12 within a foreign jurisdiction. The first computing entity 12 includes an asset management unit 22 including a digital asset-based interaction interface 25. The digital asset-based interaction interface 25 includes a dynamic digital asset balance module 104.

The dynamic digital asset balance module 104 is operable to present digital asset balances in terms of other assets as well as current exchange rates by connecting to a worldwide network of digital asset exchange entities. In FIG. 14A, the dynamic digital asset balance module 104 of the foreign first computing entity 12 within a domestic jurisdiction includes balances 106. The balances 106 display one or more dynamic digital asset balances and/or exchange rates to a user of the foreign first computing entity 12 based on user preferences, location information (e.g., obtained vis GPS), default settings, etc. For example, the user of the foreign first computing entity 12 typically spends a particular digital asset and typically views it in terms of a foreign asset (e.g., the user of the foreign first computing entity 12 typically spends Bitcoin and views it in terms of Canadian Dollars). That balance is displayed in this example as the digital asset balance in terms of foreign asset 108. The digital asset to foreign asset exchange rate 110 may also be displayed.

Upon entering the domestic jurisdiction and/or based on user request, the digital asset-based interaction computing entity connects to a domestic digital asset exchange entity to calculate and include a digital asset balance in terms of a common domestic asset 112 (e.g., the Bitcoin balance is shown in terms of USD when the Canadian first computing entity enters the United States) to the balances 106 displayed. The digital asset to domestic asset exchange rate 114 may also be displayed.

As another example, when the digital asset is not recognized by a domestic digital asset exchange entity, the digital asset-based interaction computing entity connects to a foreign digital asset exchange entity to determine a digital asset to universal asset exchange rate and calculates a universal digital asset balance using the digital asset to universal asset exchange rate and an amount of the digital asset. The digital asset-based interaction computing entity connects to a domestic digital asset exchange entity to determine a universal asset to domestic asset exchange rate and calculates a balance in terms of the domestic asset. The balances are dynamically updated to reflect current exchange rates (e.g., every few minutes, each time a user open the dynamic digital asset balance module, upon request, etc.).

In FIG. 14B, the dynamic digital asset balance module 104 of the domestic first computing entity 12 within a foreign jurisdiction also includes balances 106. The balances 106 display a series of dynamic digital asset balances and exchange rates to a user of the domestic first computing entity 12 based on user preferences, location information (e.g., obtained vis GPS), default settings, etc. For example, the user of the domestic first computing entity 12 typically spends a particular digital asset and typically views it in terms of a domestic asset (e.g., the user of the domestic first computing entity 12 typically spends Bitcoin and views it in terms of USD). That balance is displayed in this example as the digital asset balance in terms of domestic asset 116. The digital asset to domestic asset exchange rate 118 may also be displayed.

Upon entering the foreign jurisdiction and/or based on user request, the balances 106 also include a digital asset balance in terms of a common foreign asset 102 (e.g., the Bitcoin balance is shown in terms of Canadian Dollars when the United States based first computing entity enters Canada). The digital asset to foreign asset exchange rate 122 may also be displayed.

As another example, when the digital asset is not recognized by a foreign digital asset exchange entity, the digital asset-based interaction computing entity connects to a domestic digital asset exchange entity to determine a digital asset to universal asset exchange rate and calculates a universal digital asset balance using the digital asset to universal asset exchange rate and an amount of the digital asset. The digital asset-based interaction computing entity connects to a foreign digital asset exchange entity to determine a universal asset to foreign asset exchange rate and calculates a balance in terms of the foreign asset. The balances are dynamically updated to reflect current exchange rates (e.g., every few minutes, each time a user open the dynamic digital asset balance module, upon request, etc.). More or less balances may be shown. For example, the user stores a variety of digital assets and a balance pertaining to each digital asset is shown.

Figure 15:
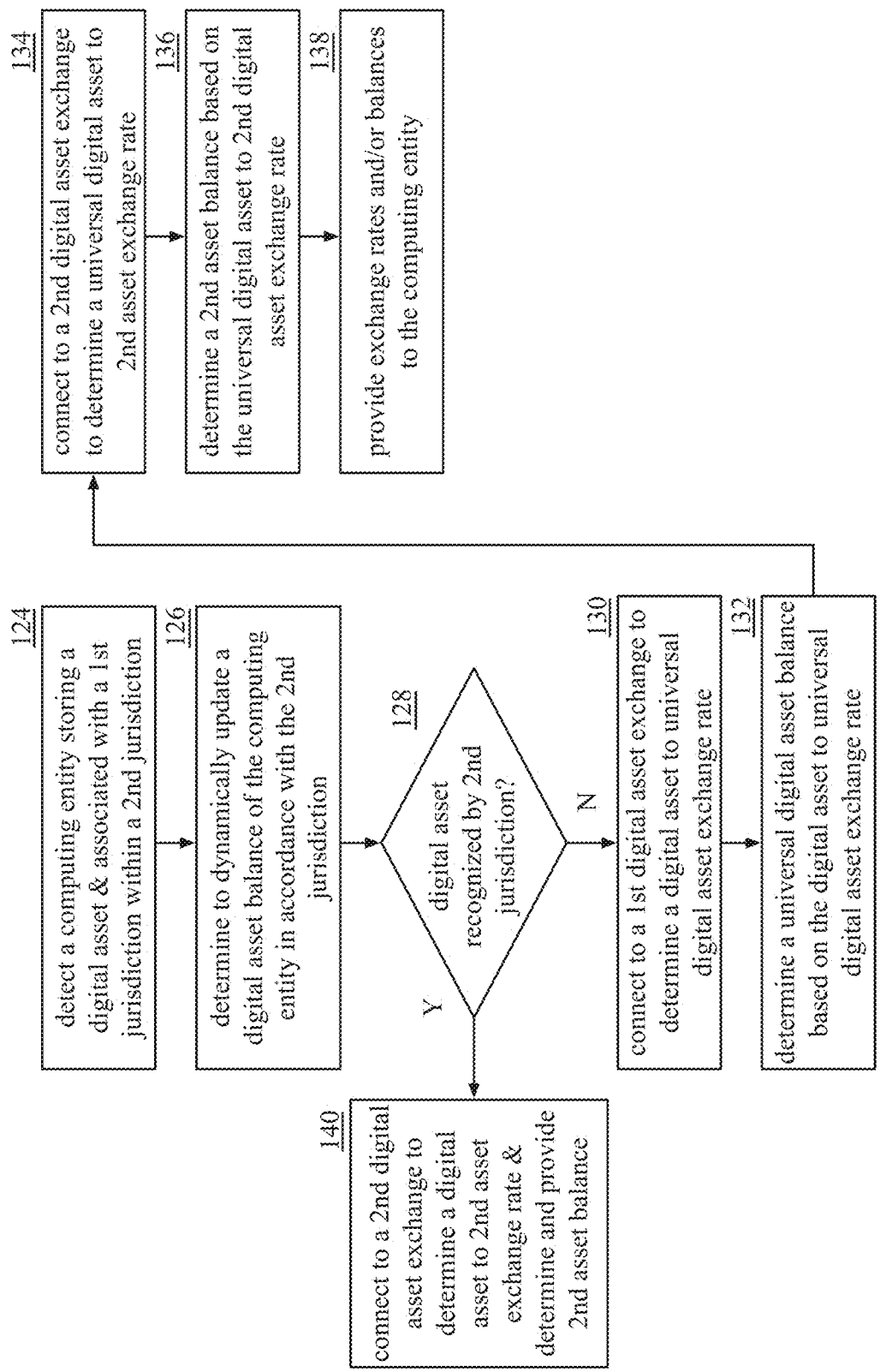
FIG. 15 is a flowchart of an example of a method for presenting dynamic digital asset balances within a borderless digital asset-based interaction system.

FIG. 15 is a flowchart of an example of a method for presenting dynamic digital asset balances within a borderless digital asset-based interaction system. The method begins with step 124 where a digital asset-based interaction computing entity of the borderless digital asset-based interaction system detects presence of a computing entity of the digital asset-based interaction system associated with a first jurisdiction within a second jurisdiction. For example, the digital asset-based interaction computing entity detects the presence based on a GPS signal, a user input, and/or an initiated interaction within the second jurisdiction. The computing entity stores a digital asset that may or may not be recognized for use within the second jurisdiction (e.g., a digital asset exchange entity of the second jurisdiction may or may not be able to exchange the digital asset).

The method continues with step 126 where the digital asset-based interaction computing entity determines to provide dynamic balance updates and/or exchange rates to the computing entity pertaining to the second jurisdiction. The digital asset-based interaction computing entity may determine to provide dynamic balance updates based on a default setting (e.g., every time a computing entity is in a new jurisdiction, provide balance updates pertaining to that jurisdiction), a user preference, a request, an initiated interaction, etc.

The method continues with step 128 where the digital asset-based interaction computing entity determines whether the digital asset is recognized for use (i.e., exchange) within the second jurisdiction. When a digital asset stored by the computing entity is not recognized for exchange in the second jurisdiction, the method continues with step 130 where the digital asset-based interaction computing entity connects to a first digital asset exchange entity associated with the first jurisdiction to determine a digital asset to a universal digital asset exchange rate. The method continues with step 132 where the digital asset-based interaction computing entity determines a digital asset balance in terms of the universal digital asset (the universal digital asset balance) based on the digital asset to a universal digital asset exchange rate and an amount of the digital asset.

The method continues with step 134 where digital asset-based interaction computing entity connects to a second digital asset exchange entity associated with the second jurisdiction to determine a universal digital asset to second asset exchange rate. The second asset is a commonly used asset of the second jurisdiction (e.g., a local fiat currency). The method continues with step 136 where the digital asset-based interaction computing entity determines a digital asset balance in terms of the second asset (the second asset balance) based on the universal digital asset to second asset exchange rate and the digital asset balance in terms of the universal digital asset. The method continues with step 138 where the digital asset-based interaction computing entity provides dynamic balance updates and/or exchange rates to the computing entity.

The dynamic balance updates and/or exchange rates include one or more of the digital asset to a universal digital asset exchange rate, the digital asset balance in terms of the universal digital asset, a universal digital asset to second asset exchange rate, a digital asset balance in terms of the second asset. The balances are dynamically updated to reflect current exchange rates (e.g., every few minutes, each time a user open the dynamic digital asset balance module, upon request, etc.). More or less balances may be determined and provided to the computing entity. For example, a user of the computing entity stores a variety of digital assets and a balance pertaining to each digital asset is provided.

When a digital asset stored by the computing entity is recognized for exchange in the second jurisdiction, the method continues with step 140 where the digital asset-based interaction computing entity connects to entity connects to the second digital asset exchange entity associated with the second jurisdiction to determine a digital asset to second asset exchange rate, determines a digital asset balance in terms of the second asset based on the digital asset to second asset exchange rate and an amount of the digital asset, and provides dynamic balance updates and/or exchange rates to the computing entity. The dynamic balance updates and/or exchange rates include one or more of the digital asset to second asset exchange rate and the digital asset balance in terms of the second asset.

Figure 16:
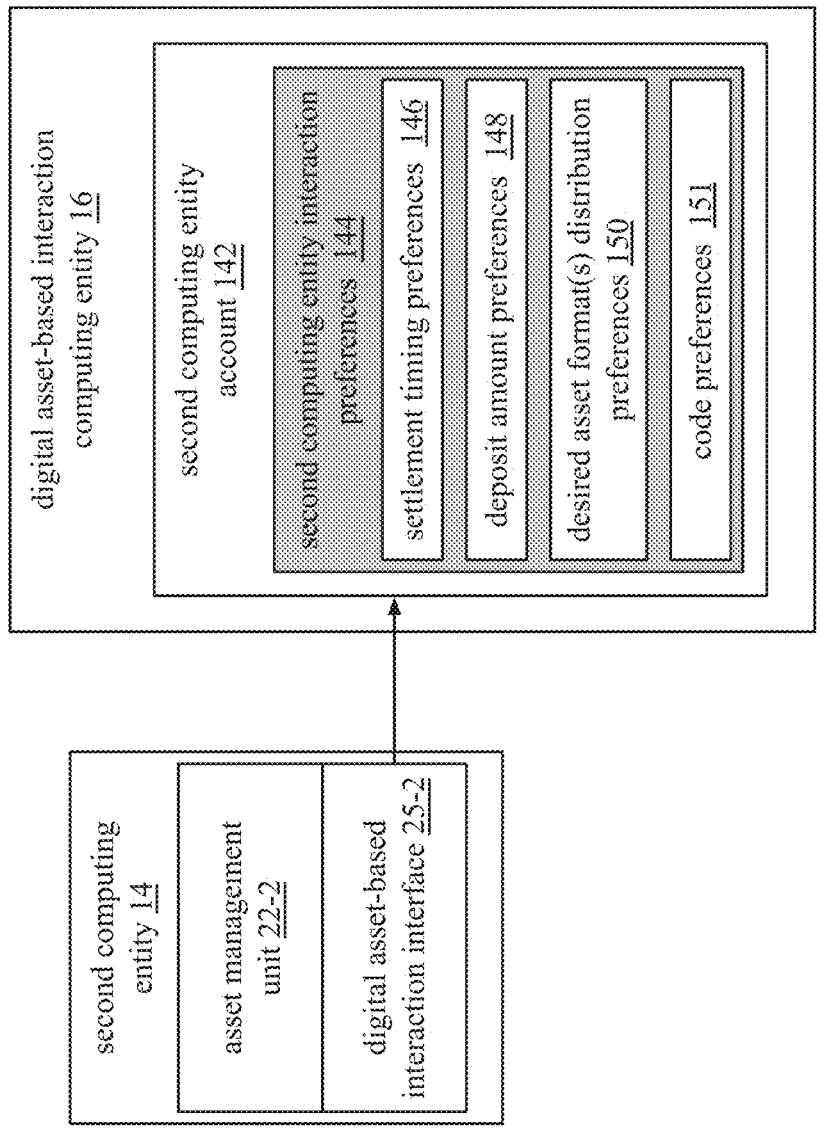
FIG. 16 is a schematic block diagram of another embodiment of a digital asset-based interaction system.

FIG. 16 is a schematic block diagram of another embodiment of a digital asset-based interaction system. A portion of the digital asset-based interaction system is shown to include a second computing entity 14 and the digital asset-based interaction computing entity 16. The second computing entity 14 includes an asset management unit 22-2 including the digital asset-based interaction interface 25-2. The second computing entity 14 is associated with the digital asset-based interaction computing entity 16 via the digital asset-based interaction interface 25-2 and a second computing entity account 142 managed by the digital asset-based interaction computing entity 16.

The digital asset-based interaction computing entity 16 is operable to store second computing entity interaction preferences 144 related to receiving assets from a digital asset-based interaction within the second computing entity account 142. The second computing entity interaction preferences 144 (i.e., second computing entity customizable digital asset-based interaction preferences) are stored privately and off-chain (e.g., on a digital asset-based interaction computing entity server). The second computing entity interaction preferences 144 are fully customizable due to the decentralized (i.e., there is no need for bank involvement) and collaterally-backed features of the digital asset-based interaction system. In this example, the second computing entity interaction preferences 144 include settlement timing preferences 146, deposit amount preferences 148, desired asset format(s) distribution preferences 150, and code preferences 151.

The settlement timing preferences 146 may include a preference for immediate settlements (e.g., the second computing entity prefers to be paid immediately), or a preference for a particular time period for settlements (e.g., by the end of the day, on the hour, once a week, etc.). The deposit amount preferences 148 may include a preference to deposit the full amount of each digital asset-based interaction or a preference to send a deposit to the second computing entity 14 when a certain amount is reached (e.g., send a deposit when $100 worth of digital asset-based interactions are received, etc.).

The desired asset format(s) distribution preferences 150 may include the type of desired asset format(s) it accepts and/or a desired percentage and/or amount of different desired asset format(s) preferred (e.g., $500 in USD, then accept in Bitcoin, accept 15% in Bitcoin and 85% in USD per interaction, etc.). The code preferences 151 relate to code generation and/or code acceptance preferences. For example, the second computing entity may only accept codes (e.g., a scannable barcode) that authorize charges up to a certain amount (e.g., $25). As another example, the code preferences 151 may limit the number of codes (e.g., by amount and/or frequency) generated for any one entity and/or include time period restrictions for use (e.g., within a day, a week, etc.).

Figure 17:
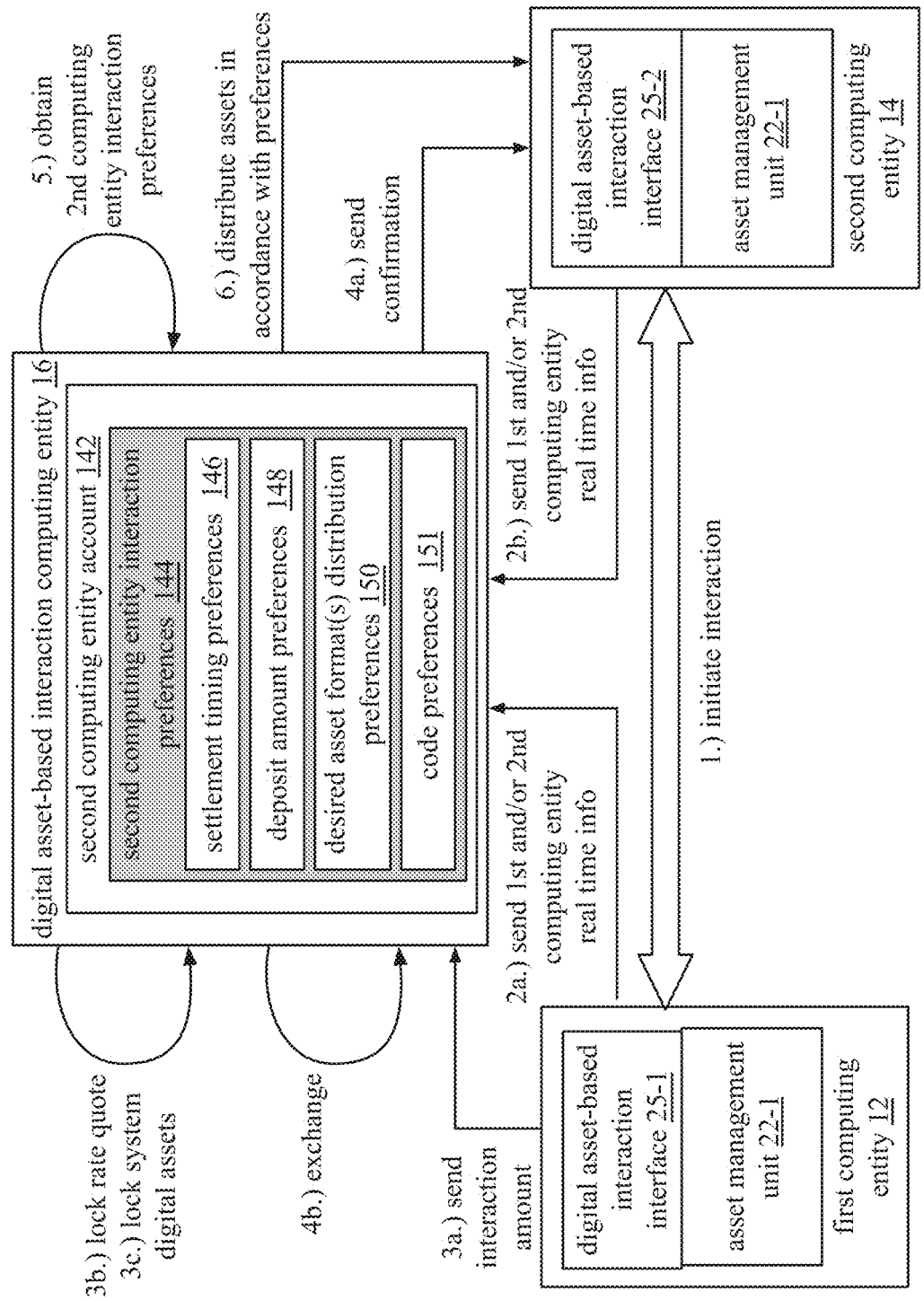
FIG. 17 is a flowchart of an example of a method for a digital-asset based interaction in accordance with second computing entity customizable digital asset-based interaction preferences.

FIG. 17 is a flowchart of an example of a method for a digital-asset based interaction in accordance with second computing entity customizable digital asset-based interaction preferences. FIG. 17 includes the first computing entity 12, the second computing entity 14, and the digital asset-based interaction computing entity 16 of a digital asset-based interaction system. The first computing entity 12 includes an asset management unit 22-1 that includes a digital asset-based interaction interface 25-1 that interfaces with the digital asset-based interaction computing entity 16 and may be coupled to one or more scanning devices. The second computing entity 14 includes a digital asset-based interaction interface 25-2 that interfaces with the digital asset-based interaction computing entity 16. For example, the second computing entity 14 is a merchant POS device that includes one or more scanning devices.

The digital asset-based interaction computing entity 16 stores second computing entity interaction preferences 144 (i.e., second computing entity customizable digital asset-based interaction preferences) related to receiving assets from a digital asset-based interaction in a second computing entity account 142 privately and off-chain (e.g., on a digital asset-based interaction computing entity server). The second computing entity interaction preferences 144 include settlement timing preferences 146, deposit amount preferences 148, desired asset format(s) distribution preferences 150, and code preferences 151 as discussed with reference to FIG. 16.

The method begins with step 1 where a digital asset-based interaction is initiated between the first and second computing entities. For example, the first computing entity selects to pay the second computing entity 14 via an entity selection module of the digital asset-based interaction interface 25-1. For example, a user of the first computing entity 12 is in a merchant's brick and mortar store and selects the merchant from an entity list displayed within the entity selection module of the digital asset-based interaction interface 25-1 based on first computing entity GPS information (e.g., closest merchants are listed first, etc.). As another example, the second computing entity 14 is a POS register and one or more of the first computing entity 12 and the second computing entity 14 select a digital asset-based payment option during checkout. As another example, the second computing entity 14 is an e-commerce website, and a user of the first computing entity 12 selects a digital asset-based payment option on a checkout page of the e-commerce website.

Upon initiation of the interaction, the method continues with steps 2a and 2b where the first and/or second computing entity real time information is sent to the digital asset-based interaction computing entity 16 (e.g., where the first computing entity sends first and/or second computing entity real time information and/or the second computing entity sends first and/or second computing entity real time information).

The first computing entity real-time information includes an identifier (e.g., a user ID) and a type of digital asset to use in a real-time digital asset-based interaction with the second computing entity 14. For example, when the first computing entity 12 selects a merchant, the user may also select a specific digital asset (e.g., Bitcoin) to use for payment. Alternatively, a preferred digital asset is stored as a default payment method. The first and/or second computing entity real-time information may also include an identifier of the second computing entity (e.g., a merchant ID) and/or other second computing entity information the first computing entity obtained by initiating the interaction. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc.

The second computing entity real-time information includes an identifier (e.g., a merchant ID) and a desired asset format (e.g., a fiat currency, a digital asset, etc.) it wishes to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, a request for first computing entity information, etc.

The method continues with steps 3a-3c which may occur concurrently or in a different order (e.g., step 3b occurs slightly before step 3a). The method continues with step 3a where the first computing entity 12 sends the amount of the digital asset-based interaction in the type of digital asset it wishes to use to the digital asset-based interaction computing entity 16 (e.g., based on a request from the digital asset-based interaction computing entity 16 and/or the second computing entity 14, based on scanning a scannable code presented by the second computing entity 14, based on a smart contract data input, etc.).

At step 3b, the digital asset-based interaction computing entity 16 locks the rate quote for the digital asset selected by the first computing entity 12 such that the rate quote presented to the first computing entity 12 (via the asset management unit 22-1 balance in US dollars or other digital asset) is what is used for the real-time digital asset-based interaction even if the rate fluctuates during the interaction.

The method continues with step 3c where the digital asset-based interaction computing entity 16 locks an amount of system digital asset (e.g., that was deposited by the digital asset management computing entity associated with the asset management unit 22) as collateral for the real-time digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with steps 4a-4b which may occur concurrently or in a different order (e.g., step 4b occurs slightly before step 4a). The method continues with step 4a where the digital asset-based interaction computing entity 16 exchanges the amount of digital asset to a substantially equivalent amount of assets in the desired asset format. The method continues with step 4b where the digital asset-based interaction computing entity 16 sends a confirmation to the second computing entity 14 that the digital asset-based interaction is approved (i.e., authorized).

The method continues with step 5 where the digital asset-based interaction computing entity 16 obtains the second computing entity interaction preferences 144. The method continues with step 6 where the digital asset-based interaction computing entity 16 distributes the assets in the desired asset format to the second computing entity in accordance with the second computing entity interaction preferences. The method continues with steps similar to steps 36-44 of FIGS. 2 and 2A.

Figure 18:
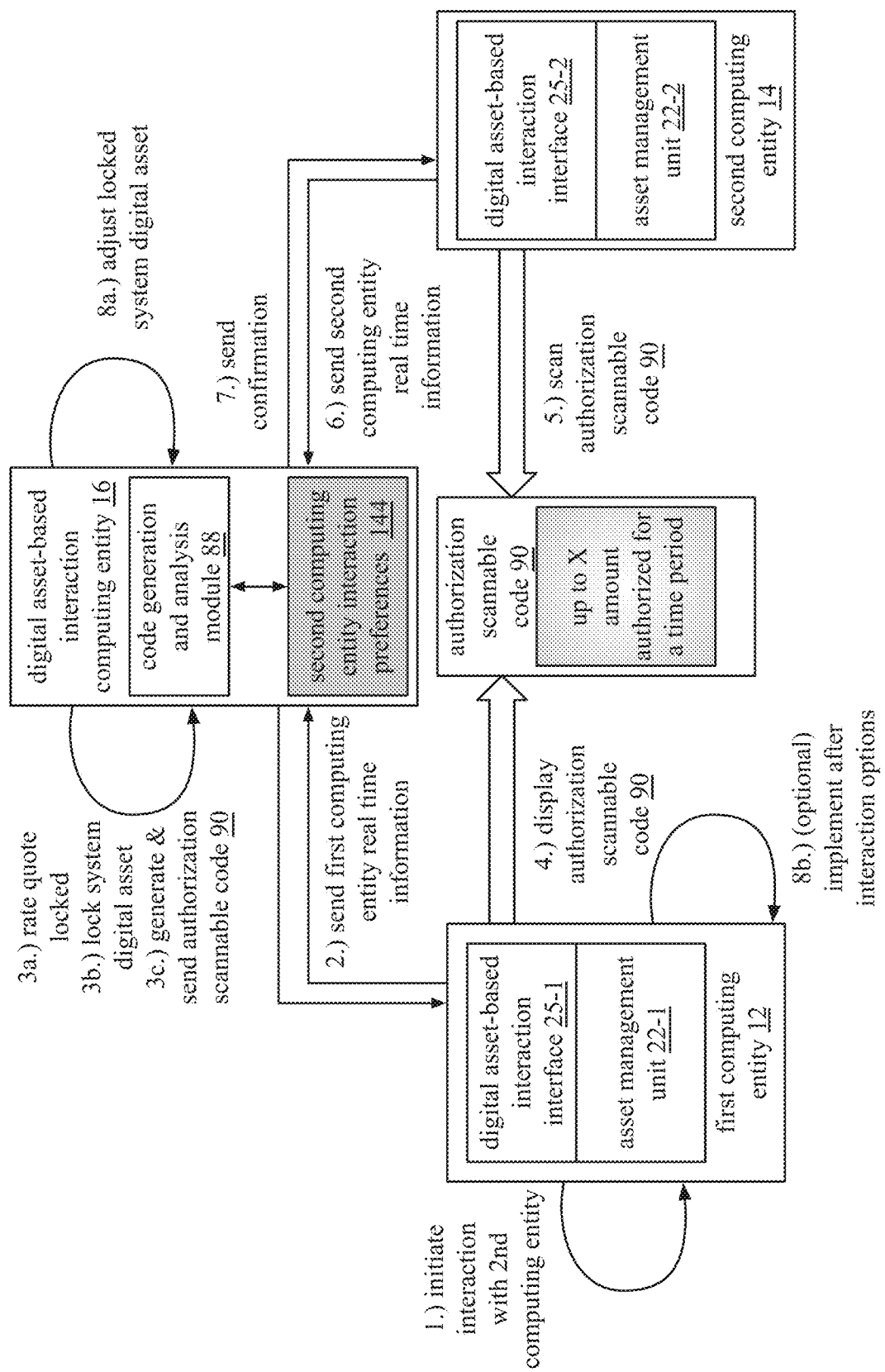
FIG. 18 is a flowchart of an example of a method for a code display interaction mode of a digital asset-based interaction system.

FIG. 18 is a flowchart of an example of a method for a code display interaction mode of a digital asset-based interaction system. FIG. 18 includes the first computing entity 12, the second computing entity 14, and the digital asset-based interaction computing entity 16 of a digital asset-based interaction system. The first computing entity 12 includes an asset management unit 22-1 that includes a digital asset-based interaction interface 25-1 that interfaces with the digital asset-based interaction computing entity 16 and is coupled to one or more scanning devices.

The second computing entity 14 includes a digital asset-based interaction interface 25-2 that interfaces with the digital asset-based interaction computing entity 16. In this example, the second computing entity 14 is a merchant POS device that includes one or more scanning devices.

The digital asset-based interaction computing entity 16 includes a code generation and analysis module 88 operable to generate and send scannable codes containing digital asset-based interaction authorization information to one or more of the first computing entity 12 and the second computing entity 14. A scannable code may be a onedimensional barcode, a two-dimensional barcode (e.g., a QR code), or any type of scannable/graphical code that can be scanned and/or read. The digital asset-based interaction computing entity 16 also includes second computing entity interaction preferences 144.

When generating the scannable code, the digital asset-based interaction computing entity accesses the second computing entity interaction preferences 144 to determine if any preferences relate to code generation and/or code usage (e.g., the code preferences). For example, the second computing entity may only accept codes (e.g., a scannable barcode) that authorize charges up to a certain amount (e.g., $25). If the digital asset-based interaction is for more than the amount, additional codes will need to be generated. As another example, the code preferences may limit the amount of codes (e.g., by amount and/or frequency) used by any one entity and/or include time period restrictions for use (e.g., within a day, a week, etc.).

For a code display interaction mode, the method begins with step 1 where the first computing entity 12 initiates an interaction with the second computing entity 14. For example, the first computing entity selects to pay the second computing entity 14 via an entity selection module of the digital asset-based interaction interface 25-1. For example, a user of the first computing entity 12 is in a merchant's brick and mortar store and selects the merchant from an entity list displayed based on first computing entity GPS information (e.g., closest merchants are listed first). The method continues with step 2, where selecting the second computing entity 14 sends first computing entity real-time information to the digital asset-based interaction computing entity 16.

The first computing entity real-time information includes an identifier (e.g., a user ID) and a type of digital asset to use in a real-time digital asset-based interaction with the second computing entity 14. For example, when the first computing entity 12 selects a merchant, the user may also select a specific digital asset (e.g., Bitcoin) to use for payment. Alternatively, a preferred digital asset is stored as a default payment method. The first computing entity real-time information may include other metadata such as user loyalty information (e.g., a user's customer loyalty account number associated with the merchant), user account information associated with a merchant (e.g., username, password, etc.), personal information (e.g., address, name, etc.), shipping details, etc.

The method continues with steps 3a-3c which may occur concurrently or in a different order (e.g., step 3b occurs slightly before step 3a). In step 3a, the digital asset-based interaction computing entity 16 locks the rate quote for the digital asset selected by the first computing entity 12 such that the rate quote presented to the first computing entity 12 (via the asset management unit 22-1 balance in US dollars or other asset unit) is what is used for the real-time digital asset-based interaction even if the rate fluctuates during the interaction.

The method continues with step 3b where the digital asset-based interaction computing entity 16 locks an amount of system digital asset (e.g., that was deposited by the digital asset management computing entity associated with the asset management unit 22) as collateral for the digital asset-based interaction. The amount of system digital asset locked may be based on the first computing entity 12 (e.g., how much the first computing entity typically spends, how much digital asset the first computing entity has in the asset management unit, etc.) and/or the second computing entity 14 (e.g., what type of products the merchant sells, an average price point of items the merchant sells, a default collateral amount the merchant requires, etc.).

The method continues with step 3c where the code generation and analysis module 88 of the digital asset-based interaction computing entity 16 generates and sends an authorization scannable code 90 to the first computing entity 12 in accordance with the second computing entity interaction preference 144. The format of the authorization scannable code 90 generated depends on the second computing entity (e.g., code preferences, the capabilities of POS software and/or hardware involved, etc.). For example, the authorization scannable code 90 generated depends on the scanning technology used by the second computing entity. A second computing entity may also require the digital asset-based interaction computing entity 16 generate and send a verification code along with an authorization scannable code 90. For example, a verification code is an alpha numeric code that can be manually entered or scanned by the second computing entity 14.

If a verification code is required, the code generation and analysis module 88 generates and sends a temporary verification code along with the authorization scannable code 90 to the first computing entity 12. The authorization scannable code 90 authorizes an interaction for up to a certain amount (e.g., X amount) for a time period (e.g., 5-30 seconds). The certain amount authorized may be based on one or more of the amount of system digital asset locked, the type of digital asset involved in the interaction, the type of interaction, the first computing entity 12, the second computing entity 14, etc.

The time period may be a few seconds up to a few minutes of time depending on the first computing entity 12, the type of interaction, and/or the second computing entity 14. For example, a fast food retail payment may have a shorter time period than a car purchase payment because the car purchase may involve lengthy paperwork and identity verification checks coinciding with payment. If the time period expires prior to real-time digital asset-based interaction confirmation, the authorization scannable code 90 will no longer be valid, and the first computing entity will need to request a new authorization scannable code. Alternatively, the digital asset-based interaction computing entity 16 may automatically send a new authorization scannable code to the first computing entity 12 every few seconds for a time period (e.g., up to 5 minutes) before the first computing entity 12 would need to request a new authorization scannable code 90.

The method continues with step 4 where the first computing entity 12 displays the authorization scannable code 90 (via the code module of the digital asset-based interaction interface 25-1) on a display of the first computing entity 12. The method continues with step 5 where the second computing entity 14 is operable to scan the authorization scannable code 90 via a scanning device of the second computing entity 14. For example, a user of the first computing entity 12 places the first computing entity 12 display near a scanning device of the second computing entity 14 (e.g., the second computing entity 14 is a tablet and the scanning device is a front or back camera) for the second computing entity 14 to capture the authorization scannable code 90. In that example, the second computing entity 14 may be an unattended POS register (e.g., at a retail kiosk, self-checkout location, a gas pump checkout, a vending machine, etc.).

As another example, the second computing entity 14 is a POS register that includes a handheld scanning device (e.g., a barcode scanner, a smart phone camera, etc.). The user of the first computing entity 12 presents the authorization scannable code 90 to an attendant of the second computing entity 14, and the attendant scans the user authorization scannable code 90 with the handheld scanning device.

If user metadata is included in the authorization scannable code 90, the second computing entity 14 is operable to view that metadata upon scanning. For example, the user's loyalty information applies a discount to the total amount owed. As another example, a user's shipping information adjusts the shipping rate applied to the total amount owed. As another example, the user metadata authorizes a future and/or reoccurring charge (e.g., the merchant is a hotel and requires a payment method "on file"). In that example, the second computing entity is authorized to store limited first computing entity 12 information such that the second computing entity can send a future request for payment to the digital asset-based interaction computing entity when a future payment is due. The digital asset-based interaction computing entity receives that request from the second computing entity and generates a push notification to send to the first computing entity where the first computing entity can authorize the future payment via the push notification.

The method continues with step 6 where, when the second computing entity 14 scans the authorization scannable code 90, the second computing entity 14 sends second computing entity real-time information to the digital asset-based interaction computing entity 16. The second computing entity real-time information includes an identifier (e.g., a merchant ID) and a desired asset format (e.g., a fiat currency, a cryptocurrency, etc.) it wishes to receive assets. The second computing entity real-time information also includes the amount of the real-time digital asset-based interaction in this example. The second computing entity real-time information may include other information and/or metadata such as discounts offered and/or applied, shipping details (rates, method, etc.), bill splitting options, etc.

When the digital asset-based interaction computing entity 16 receives both the first computing entity real-time information and the second computing entity real-time information and the system digital asset has been locked for the digital asset-based interaction, the method continues with step 7 where the digital asset-based interaction computing entity 16 provides a confirmation to the second computing entity 14 that the digital asset-based interaction is approved (i.e., authorized).

The method continues with step 8a where the digital asset-based interaction computing entity 16 adjusts the amount of locked system digital asset based on the amount of the real-time digital asset-based interaction. The authorization scannable code 90 implies authorization of the interaction, but funds are not necessarily pulled from the first computing entity 12 for a time period. As such, the method continues with an optional step 8b where the first computing entity 12 has a certain amount of time (a few seconds to up to five minutes) to implement after-interaction options. The after-interaction options include switching between asset management units, switching the type of digital asset used, adding a tip, splitting the bill, moving items for purchase between users, etc. Further, because digital assets are not obtained immediately, if a network connection issue occurs (e.g., internet connection is lost for a few seconds) after interaction confirmation, funds can be pulled when the network connection is reestablished. The method continues with steps similar to steps 36-44 of FIGS. 2 and 2A.

Figure 19:
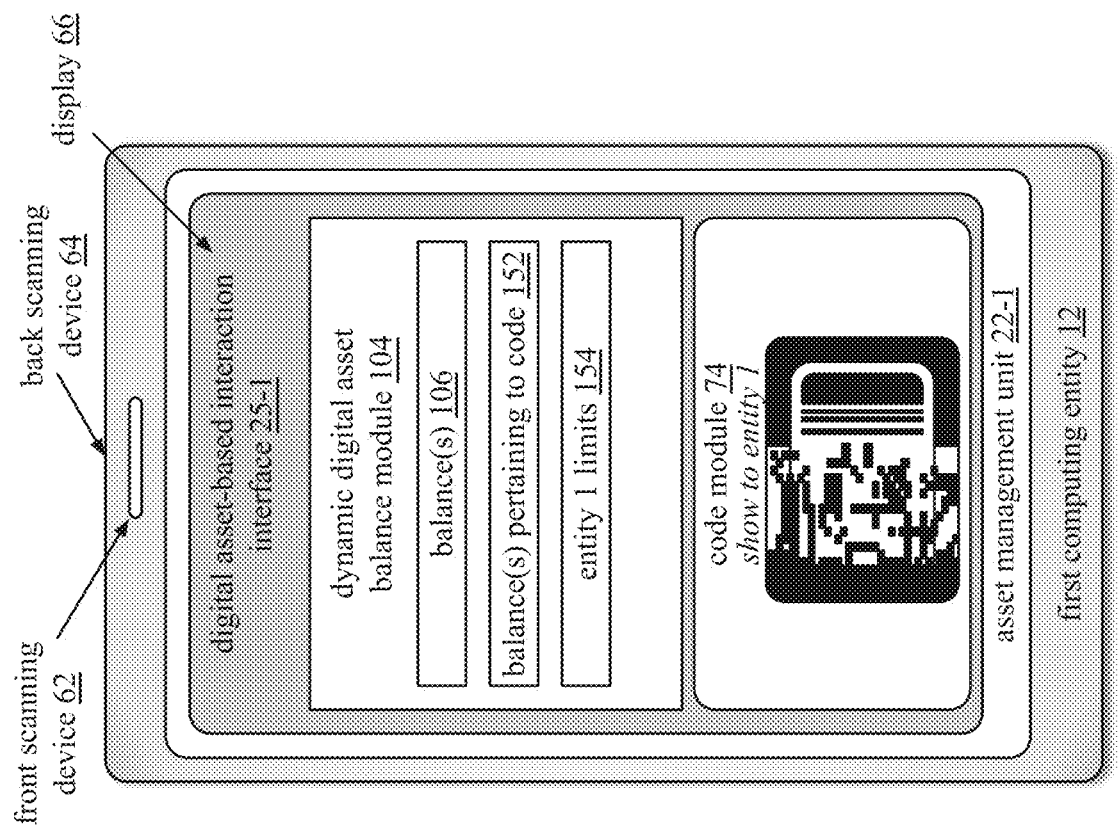
FIG. 19 is a schematic block diagram of an embodiment of a first computing entity of a digital asset-based interaction system.

FIG. 19 is a schematic block diagram of an embodiment of a first computing entity of a digital asset-based interaction system. The first computing entity 12 includes an asset management unit 22-1 including a digital asset-based interaction interface 25-1. The digital asset-based interaction interface 25-1 includes a dynamic digital asset balance module 104 and a code module 74.

The dynamic digital asset balance module 104 is operable to present digital asset balances in terms of other assets as well as current exchange rates by connecting to a worldwide network of digital asset exchange entities as discussed with reference to previous Figures. The balances 106 of the dynamic digital asset balance module 104 display one or more dynamic digital asset balances and/or exchange rates to a user of the first computing entity 12 based on user preferences, location information (e.g., obtained vis GPS), default settings, etc.

The dynamic digital asset balance module 104 is also operable to display balance information that pertains to a particular entity and/or code in a particular digital asset-based interaction (e.g., balance(s) pertaining to code 152, entity 1 limits 154, etc.). For example, the first computing entity 12 initiates a digital asset-based interaction with a second computing entity in a code display interaction mode as discussed with reference to FIG. 18.

The digital asset-based interaction computing entity is operable to generate and send an authorization charge code to the code module 74 of the first computing entity 12 with instructions to show the code to the second computing entity 14 (e.g., entity 1). When generating the authorization charge code, the digital asset-based interaction computing entity accesses second computing entity interaction preferences to determine if any preferences relate to code generation and/or code usage (e.g., code preferences). For example, the second computing entity may only allow codes that authorize charges up to a certain amount (e.g., $25). If the digital asset-based interaction is for more that the amount, additional codes will need to be generated. As another example, the second computing entity may limit the number of interactions (e.g., by amount and/or frequency) during a particular time period (e.g., a day, a week, etc.).

When the authorization charge code is sent to the code module 74 of the first computing entity 12, the digital asset-based interaction computing entity updates and/or includes information in the dynamic digital asset balance module 104 accordingly. For example, the dynamic digital asset balance module 104 lists balance(s) pertaining to the code 152 (e.g., how much is available on a particular code and/or available to use with a particular entity). As another example, the dynamic digital asset balance module 104 lists limits pertaining to a particular entity (e.g., entity 1) associated with the second computing entity. For example, the entity 1 limits 154 states that entity 1 only accepts authorization charge codes of $25 or less.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   storing, by a digital asset backing account of a digital asset-based interaction system, system digital assets to back digital asset-based interactions associated with a first computing entity of the digital asset-based interaction system;
   initiating, by one or more of the first computing entity and a second computing entity of the digital asset-based interaction system, a reoccurring digital asset-based interaction between the first and second computing entity, wherein the reoccurring digital asset-based interaction includes providing, by the first computing entity, an amount of digital assets and the second computing entity accepting an amount of desired assets on a reoccurring basis;
   providing, by the first computing entity, first computing entity information pertaining to the reoccurring digital asset-based interaction to the second computing entity;
   storing, by the second computing entity, the first computing entity information;
   obtaining, by the second computing entity, an indication to proceed with a current digital asset-based interaction of the reoccurring digital asset-based interaction;
   sending, by the second computing entity, at least a portion of the first computing entity information and second computing entity information to a digital asset-based interaction computing entity of the digital asset-based interaction system, wherein the second computing entity information includes a desired asset format of the desired assets;
   locking, by the digital asset-based interaction computing entity, an amount of system digital assets of the system digital assets as collateral for the current digital asset-based interaction;
   executing, by the digital asset-based interaction computing entity, a real-time digital asset-based interaction process to obtain the amount of the digital assets from the first computing entity and send the second computing entity the amount of the desired assets based on the at least the portion of the first computing entity information and the second computing entity information; and
   executing, by the digital asset-based interaction computing entity, a nonreal-time digital asset-based interaction process to verify that the amount of the digital assets was received from the first computing entity.

2. The method of claim 1, wherein the first computing entity information includes one or more of:
   a first computing entity identifier (ID);
   an address associated with the first computing entity;
   authentication information; and
   reoccurring digital asset-based interaction information, wherein the reoccurring digital asset-based interaction information includes an indication of a digital asset type of the digital assets the first computing entity wishes to use in the reoccurring digital asset-based interaction.

3. The method of claim 1 further comprises:
   when the amount of system digital assets is locked:
      locking, by the digital asset-based interaction computing entity, a rate quote for the amount of the digital assets during the current digital asset-based interaction.

4. The method of claim 1, wherein the obtaining the amount of the digital assets from the first computing entity comprises:
   pulling, by the digital asset-based interaction computing entity, the amount of the digital assets from the first computing entity, wherein the first computing entity information includes an address to pull the amount of digital assets from and an authorization to pull funds.

5. The method of claim 4 further comprises:
   sending, by the digital asset-based interaction computing entity, a notification to the first computing entity that the amount of the digital assets will be pulled.

6. The method of claim 1, wherein the obtaining the amount of the digital assets from the first computing entity comprises:
   sending, by the digital asset-based interaction computing entity, a request for the amount of the digital assets to the first computing entity; and
   sending, by the first computing entity, the amount of the digital assets to the digital asset-based interaction computing entity.

7. The method of claim 1 further comprises:
   sending, by the digital asset-based interaction computing entity, a notification to one or more of the first computing entity and the second computing entity that the digital asset-based interaction is successful.

8. The method of claim 1, wherein executing the real-time digital asset-based interaction process includes:
obtaining, by the digital asset-based interaction computing entity, receipt of the amount of the digital assets from the first computing entity;
exchanging, by the digital asset-based interaction computing entity, the amount of the digital assets for a substantially equivalent amount of the desired assets; and
sending, by the digital asset-based interaction computing entity, the substantially equivalent amount of the desired assets to the second computing entity.

9. The method of claim 1, wherein the executing the nonreal-time digital asset-based interaction process includes:
implementing, by the digital asset-based interaction computing entity, a nonreal-time verification process associated with the digital asset to verify the obtaining the amount of the digital assets; and
when the amount of digital assets obtained from the first computing entity is verified by the nonreal-time verification process:
unlocking, by the digital asset-based interaction computing entity, the amount of system digital assets; and
when the amount of digital assets obtained from the first computing entity is not verified by the nonreal-time verification process:
consuming, by the digital asset-based interaction computing entity, the amount of system digital assets.

10. A non-transitory computer readable memory comprises:
a first memory element that stores operational instructions that, when executed by a digital asset backing account of a digital asset-based interaction system, causes the digital asset backing account to:
store system digital assets to back digital asset-based interactions associated with a first computing entity of the digital asset-based interaction system;
a second memory element that stores operational instructions that, when executed by one or more of the first computing entity and a second computing entity of the digital asset-based interaction system, causes the one or more of the first computing entity and the second computing entity to:
initiate a reoccurring digital asset-based interaction between the first and second computing entity, wherein the reoccurring digital asset-based interaction includes providing, by the first computing entity, an amount of digital assets and the second computing entity accepting an amount of desired assets on a reoccurring basis;
a third memory element that stores operational instructions that, when executed by the first computing entity, causes the first computing entity to:
provide first computing entity information pertaining to the reoccurring digital asset-based interaction to the second computing entity;
a fourth memory element that stores operational instructions that, when executed by the second computing entity, causes the second computing entity to:
store the first computing entity information; and
obtain an indication to proceed with a current digital asset-based interaction of the reoccurring digital asset-based interaction;
a fifth memory element that stores operational instructions that, when executed by the second computing entity, causes the second computing entity to:
send at least a portion of the first computing entity information and second computing entity information to a digital asset-based interaction computing entity of the digital asset-based interaction system, wherein the second computing entity information includes a desired asset format of the desired assets; and
a sixth memory element that stores operational instructions that, when executed by the digital asset-based interaction computing entity, causes the digital asset-based interaction computing entity to:
lock an amount of system digital assets of the system digital assets as collateral for the current digital asset-based interaction;
execute a real-time digital asset-based interaction process to obtain the amount of the digital assets from the first computing entity and send the second computing entity the amount of the desired assets based on the at least the portion of the first computing entity information and the second computing entity information; and
execute a nonreal-time digital asset-based interaction process to verify that the amount of the digital assets was received from the first computing entity.

11. The non-transitory computer readable memory of claim 10, wherein the first computing entity information includes one or more of:
a first computing entity identifier (ID);
an address associated with the first computing entity;
authentication information; and
reoccurring digital asset-based interaction information, wherein the reoccurring digital asset-based interaction information includes an indication of a digital asset type of the digital assets the first computing entity wishes to use in the reoccurring digital asset-based interaction.

12. The non-transitory computer readable memory of claim 10, wherein the sixth memory element further stores operational instructions that, when executed by the digital asset-based interaction computing entity, causes the digital asset-based interaction computing entity to:
when the amount of system digital assets is locked:
lock a rate quote for the amount of the digital assets during the current digital asset-based interaction.

13. The non-transitory computer readable memory of claim 10, wherein the sixth memory element further stores operational instructions that, when executed by the digital asset-based interaction computing entity, causes the digital asset-based interaction computing entity to obtain the amount of the digital assets from the first computing entity by:
pulling the amount of the digital assets from the first computing entity, wherein the first computing entity information included an address to pull the amount of digital assets from and an authorization to pull funds.

14. The non-transitory computer readable memory of claim 13, wherein the sixth memory element further stores operational instructions that, when executed by the digital asset-based interaction computing entity, causes the digital asset-based interaction computing entity to:
send a notification to the first computing entity that the amount of the digital assets will be pulled.

15. The non-transitory computer readable memory of claim 10 further comprises:

wherein the sixth memory element further stores operational instructions that, when executed by the digital asset-based interaction computing entity, causes the digital asset-based interaction computing entity to obtain the amount of the digital assets from the first computing entity by:
    sending a request for the amount of the digital assets to the first computing entity; and
a seventh memory element that stores operational instructions that, when executed by the first computing entity, causes the first computing entity to:
    send the amount of the digital assets to the digital asset-based interaction computing entity.

16. The non-transitory computer readable memory of claim 10, wherein the sixth memory element further stores operational instructions that, when executed by the digital asset-based interaction computing entity, causes the digital asset-based interaction computing entity to:
    send a notification to one or more of the first computing entity and the second computing entity that the digital asset-based interaction is successful.

17. The non-transitory computer readable memory of claim 10, wherein the sixth memory element further stores operational instructions that, when executed by the digital asset-based interaction computing entity, causes the digital asset-based interaction computing entity to execute the real-time digital asset-based interaction process by:
    obtaining receipt of the amount of the digital assets from the first computing entity;
    exchanging the amount of the digital assets for a substantially equivalent amount of the desired assets; and
    sending the substantially equivalent amount of the desired assets to the second computing entity.

18. The non-transitory computer readable memory of claim 10, wherein the sixth memory element further stores operational instructions that, when executed by the digital asset-based interaction computing entity, causes the digital asset-based interaction computing entity to execute the nonreal-time digital asset-based interaction process by:
    implementing a nonreal-time verification process associated with the digital asset to verify the obtaining the amount of the digital assets; and
    when the amount of digital assets obtained from the first computing entity is verified by the nonreal-time verification process:
        unlocking the amount of system digital assets; and
    when the amount of digital assets obtained from the first computing entity is not verified by the nonreal-time verification process:
        consuming the amount of system digital assets.

\* \* \* \* \*